United States Patent

Ross et al.

Patent Number: 5,983,215
Date of Patent: Nov. 9, 1999

[54] SYSTEM AND METHOD FOR PERFORMING JOINS AND SELF-JOINS IN A DATABASE SYSTEM

[75] Inventors: Kenneth A. Ross; Hui Lei, both of New York, N.Y.

[73] Assignee: The Trustees of Columbia University in the City of New York, New York, N.Y.

[21] Appl. No.: 08/853,108

[22] Filed: May 8, 1997

[51] Int. Cl.$^6$ .................................................. G06F 17/30
[52] U.S. Cl. ............................................................ 707/2
[58] Field of Search ........................ 707/1–10, 100–104, 707/200–206; 395/674, 676; 364/282.1, 281.3, 281.6, 230.3, 262.1

[56] References Cited

U.S. PATENT DOCUMENTS

| | | | |
|---|---|---|---|
| 5,121,494 | 6/1992 | Dias et al. | 707/2 |
| 5,241,648 | 8/1993 | Cheng et al. | 707/7 |
| 5,325,525 | 6/1994 | Shan et al. | 395/674 |
| 5,345,585 | 9/1994 | Iyer et al. | 707/2 |
| 5,408,654 | 4/1995 | Barry | 707/101 |
| 5,551,031 | 8/1996 | Cheng et al. | 707/2 |
| 5,557,791 | 9/1996 | Cheng et al. | 707/2 |
| 5,666,525 | 9/1997 | Ross | 707/2 |

OTHER PUBLICATIONS

Shapiro, "Join Processing in Database Systems with Large Main Memories", *ACM Transactions on Database Systems*, vol. 11, No. 3, Sep. 1986, pp. 239–264.

Valduriez, "Join Indices", *ACM Transactions on Database Systems*, vol. 12, No. 2, Jun. 1987, pp. 218–246.

Desai, "Performance of a Composite Attribute and Join Index", *IEEE Transactions on Software Engineering*, vol. 15, No. 2, Feb. 1989, pp. 142–152.

Kitsuregawa et al., "Join Strategies on KD–Tree Indexed Relations", University of Tokyo, IEEE, 1989;.

Blakeley et al., "Join Index, Materialized View, and Hybrid–Hash Join: a Performance Analysis", *Sixth International Conference on Data Engineering*, 1990, pp. 256–263.

Mishra et al., "Join Processing in Relational Databases", *ACT Computing Surveys*, vol. 24, No. 1, Mar. 1992, pp. 63–113.

Perrizo et al., "Distributed Join Processing Performance Evaluation", *Proceedings of the Twenty–Seventh Annual Hawaii International Conference on System Sciences*, 1994, pp. 236–245.

Li et al., "Fast Joins Using Join Indices", *Columbia University Technical Report CUCS–032–96*, Jun. 26, 1996.

*Primary Examiner*—Ruay Lian Ho
*Attorney, Agent, or Firm*—Baker & Botts L.L.P.

[57] ABSTRACT

A technique for efficiently joining multiple large tables in a database system which utilizes a join index. The technique uses a join index and minimizes the number of input/output operations while maximizing the use of the small main memory through a buffer allocation process based on the join index entries. The technique uses multi-dimensional partitioning and assigns partition identifiers to each buffer which are used to coordinate the resultant output files when the technique is complete. The output is vertically fragmented with one fragment for each input table which further allows the individual processing of each input table. The technique performs self-joins in a very efficient manner by requiring the records of the input table to be read only once.

39 Claims, 13 Drawing Sheets

|  | 201A STUDENT | 201B COURSE |
|---|---|---|
| 1 | SMITH[1] | 101 |
| 2 | SMITH[2] | 109 |
| 3 | JONES | 104 |
| 4 | DAVIS[1] | 102 |
| 5 | DAVIS[2] | 105 |
| 6 | DAVIS[3] | 106 |
| 7 | BROWN | 102 |
| 8 | BLACK | 103 |
| 9 | FRICK | 107 |

FIRST INPUT TABLE 201

|  | 205A COURSE | 205B INSTRUCTOR |
|---|---|---|
| 1 | 101 | GREEN |
| 2 | 102 | YELLOW |
| 3 | 103 | GREEN |
| 4 | 104 | WHITE |
| 5 | 105 | EVANS |
| 6 | 106 | ALBERTS |
| 7 | 106 | BEIGE |
| 8 | 108 | RED |
| 9 | 109 | GREY |

SECOND INPUT TABLE 205

|  | 203A TABLE 201 | 203B TABLE 205 |
|---|---|---|
| 1 | 7 | 2 |
| 2 | 1 | 1 |
| 3 | 3 | 4 |
| 4 | 2 | 9 |
| 5 | 6 | 6 |
| 6 | 4 | 2 |
| 7 | 6 | 7 |
| 8 | 8 | 3 |
| 9 | 5 | 5 |

JOIN INDEX 203

FIG. 2A

SYSTEM AND METHOD FOR PERFORMING JOINS AND SELF-JOINS IN A DATABASE SYSTEM

This application is related to U.S. Pat. No. 5,666,525 entitled "System and Method for Performing an Efficient Join Operation on Large Tables with a Small Main Memory" by Ross now U.S. Pat. No. 5,666,525 and U.S. Pat. No. 5,802,357 entitled "System and Method for Performing an Efficient Join Operation" by Ross and Li now U.S. Pat. No. 5,802,357.

The U.S. Government has certain rights in this invention pursuant to award 9457613 by the National Science Foundation and to CDA-96-25374.

FIELD OF INVENTION

The present invention is directed towards an efficient join operation in a database system, and more specifically toward joining tables containing a large amount of data using a join index in a system with a relatively small amount of main memory.

BACKGROUND OF THE INVENTION

The "join" operation used in database systems is the fundamental operation that allows information from different data tables to be combined in a selected way. Tables consist of collections of data grouped by a common subject matter, such as names or ages. The join operation allows a user to combine selected groups of data from multiple input data tables according to a specified condition between the records in each table to be combined. For example, a user may want to join two tables, the first containing names and telephone numbers, and the second containing names and addresses, to produce a result which contains all the records that include common names between the two tables with both their telephone numbers and addresses. The join operation is used during a "query", or data request operation, by the user of a database system. Join operations are typically expensive in terms of processing time making efficiency a critical component to performance of the database system.

In some cases, tables of data will be small relative to the amount of main memory (also called random access memory or "RAM") of the computer in the database system. An example of a relatively small table is one that contains data of 30 students names and their quarterly grades. Tables are normally organized by columns of related data. In this case, all the names would appear in one column entitled "Names". In this example of 30 records, the entire table can be read into and stored in a typical main memory of a computer at one time and can be completely processed while contained in RAM.

Other applications have input data tables that are significantly larger than the storage capacity of available main memory of the processor. These applications need to process huge amounts of information very quickly to keep up with vast amounts of input data. Examples of these applications are NASA's Earth Observing System, with an estimated 1 terabyte of data to be processed per day, and data mining applications which contain massive amounts of transaction information. Data warehousing for large organizations or companies requires storing vast amounts of sales and inventory information which must be accessed quickly and efficiently by decision support systems in order to determine profit levels, analyze costs or perform other information processing. As data collecting, data storage and processing technology advances, increasing numbers of tables containing large amounts of data will be required to be processed using join operations in a database platform. Even when considering the typical amounts of available RAM storage in large main frame computers, the size of their main memory is significantly smaller than the size of the vast input tables of data described above. Thus some intermediate results will have to be stored during processing on secondary storage devices such as disks. The input/output ("I/O") disk access is much slower than the speed of main memory. Therefore, minimizing disk I/O is critical to achieving good performance. As a result, in order to process such large amounts of data using a database system, efficient techniques for joining large relations are needed.

An important consideration in measuring the efficiency of a join operation is the number and kind of disk accesses performed during that operation. The "cost" (processing time required) of I/O operations becomes increasingly important when the tables to be joined are very large. A typical access of one block (typically 8000 bytes) of data stored on a disk using a conventional Fujitsu M2266 one gigabyte drive is about two milliseconds. The cost of rotational latency (moving the disk in a circular motion to the specified address) for that drive is about eight milliseconds. The seek time (moving the disk head up and down to the proper location on the disk) is about 16 milliseconds. Other drives have proportionate access times. While these costs are seemingly small when joining tables small in size, the costs increase drastically when the input tables are very large on the order described above. It then becomes increasingly important to minimize overall I/O costs by reducing the number of blocks transferred as well as the total number of seek and rotations involved in data transfer.

Join results from joining input tables can be computed in a number of different ways. The term "ad-hoc join" is used to describe the process of taking two input tables in a database and forming the join result by processing the entire standard representations of each table, without the benefit of any pre-computed special data structures such as indices. When the pre-computed special data structures are present, the join operation may perform more efficiently.

One such pre-computed access structure is called a join index. The join index was introduced by Valduriez in "Join Indices", ACM Transactions on Database Systems, 12(2) :218–246, 1987. A join index between two input tables maintains pairs of identifiers for records that would match if a particular join operation is performed. For example, one entry in a join index might be (1,3) which indicates that the first record in the first table will be joined with the third record in the second table when a particular join operation is performed. The join index may be maintained by the database system, and updated when records are inserted or deleted in the underlying tables. In situations where joins take place often, the processing cost of maintaining a join index will be small compared to the savings achieved in performing the join operations using the join index.

Valduriez proposes a technique to perform join operations using a join index in his article. The described method for performing the join operation requires a large amount of repetitive disk I/O (see Valduriez article, page 223). The four steps of the Valduriez method for performing the join operation using a join index on two input tables designated A and B stored in a database are: (1) read in a portion of the join index (previously constructed) and selected matches between the join index entries and the records in A which will fit into available main memory; (2) internally sort the records from A and the join index entries by their table B identifiers; (3) select matches between the join index entries and the records in B outputting the resulting record; and (4) read in the next portion of the join index and the selected records of A. Repeat steps 2, 3 and 4 until all index entries in the join index are processed.

The Valduriez method has significant drawbacks when the input tables are large and the processor uses a relatively small main memory. The primary detriment is that there is a large amount of repetitious I/O operations which must be performed during the join operation. Blocks of records in input Table B are often accessed numerous times when records located in the same disk block are indicated throughout the join index for Table B. The access repetition is caused by only processing a portion of the join index at one time. The Valduriez method is also only described for a maximum of two input tables being joined at one time.

A technique called "jive-join" for joining multiple tables together using a join index is discussed by Ross in U.S. Pat. No. 5,666,525. The jive-join technique utilizes separate temporary files of record identifiers in order to allow separate processing for each of the input tables. Furthermore, vertical partitioning of the output files stores the output records for each input table separately. By separately processing each input table, the records from each table need only to be processed once thus reducing the disk accesses performed and rotational latencies. However, the jive-join technique requires that one input table be processed before the other tables in order to allocate the buffers. This requirement also necessitates that the join index be pre-sorted by the join index record identifiers for the first processed input table. It is more efficient in the jive-join technique to assign the largest input table as the first table which is processed. Additionally, if a column in a table is to be joined with another column in the same table (a "selfjoin"), the input table must be read separately for each column processed.

Another technique for joining multiple tables together using a join index is called "slam-join" and is discussed by Ross and Li in U.S. Pat. No. 5,802,357. The slam-join technique uses a parallel-merge operation to accomplish the join operation but requires that the last table in the join be processed separately and after the other tables. The slam-join technique also requires that an input table must be read separately for each column processed while performing a self-join operation. The join index must be pre-sorted by the record identifies for the first table to be joined. It is advantageous with slam-join technique to identify the largest input table and designate that table as the last table to be processed in the join operation.

It would be advantageous to have a join technique which would perform the join operation irrespective of the join index order, could process all the input tables simultaneously and could perform a self-join operation without reading the input table multiple times.

SUMMARY OF THE INVENTION

In accordance with the present invention there is provided a method and system for performing a join operation in a database system on one or more tables comprised of individual records using a join index. The method and system of the present invention performs most efficiently when the input tables are large and the main memory used by the processor is small relative to the size of the input tables. The technique for joining tables using a join index requires reading each input table only once, writing the output data to an output file or files only once, and also maximizes the use of the available main memory through partition allocation using the join indexes. Partition identifiers assigned to the allocated partitions allows for simultaneous processing of the tables and does not require any pre-sorting of the join index. The technique only reads data blocks containing selected records from the input tables which will be part of the join result. Minimizing the number of I/O operations by reducing the number of necessary read and write operations is very important for the efficiency of a join operation when the input tables are very large because I/O operations are very time consuming.

The method of the present invention, named "stripe-join", includes the following steps: first, an array of memory partitions and partition identifiers are created with individual allocation conditions to ensure that each input partition (partitions fulfilling a single condition), and a buffer and temporary file corresponding to the input partition, will receive an approximately equal number of records. Next, a pre-existing join index is read and the record identifiers are placed in the appropriate buffer with its partition identifier based on the defined conditions and the values of the record identifier. Temporary files for each input table are created to hold buffer overflow containing the join index entry for the given input table and corresponding buffer identifiers. The content of the memory buffers are written to a mass storage device to a temporary file when the available memory in a particular buffer is full. The written records of the memory buffers are appended to the previously written records. The buffer can then accept more information. The stored temporary files for each buffer associated with a particular input table are read into main memory and sorted. For each buffer the selected records in the table are read into main memory sequentially. The records are then written to an output file based on the partition identifier in order to ensure that the records from each table will achieve the proper join result specified in the join index. Each table at the end of the join operation has a separate file or collection of associated files for its output which helps minimize the number of I/O processes by allowing the processor with a small main memory to completely process each input table only once. Multiple processors can also be used to separately process each input table to leverage the speed of the technique.

The stripe-join method applies to the case where one or more tables are to be joined. The technique works for relational databases and other types of database which support some type of record indexing system. The technique also allows an input table to be only read once when performing a self-join on two columns in the same table.

One system platform which supports the implementation of the stripe-join method includes a computer system with at least one central processing unit, limited main memory (RAM), a mass storage medium which contains input tables of large amounts of data and space to store the results of the join operation, an I/O device and connectors to transfer data between the central processing unit and the mass storage medium.

BRIEF DESCRIPTION OF THE DRAWINGS

Further objects, features and advantages of the invention will become apparent from the following detailed description taken in conjunction with the accompanying drawings showing a preferred embodiment of the invention, in which:

FIG. 2A is a graphical representation of two input tables and a join index;

DETAILED DESCRIPTION OF PREFERRED EMBODIMENTS

The present invention is a join technique in a database system using a join index which will efficiently process large input tables in a join operation when the processor used for the operation uses a relatively small main memory. The technique, however, is not constructed to only operate when the main memory is small. The technique minimizes necessary I/O operations and maximizes the use of the available main memory through a partition allocation scheme using the join indices. For convenience, the technique will be called "stripe-join."

Figure 1A:
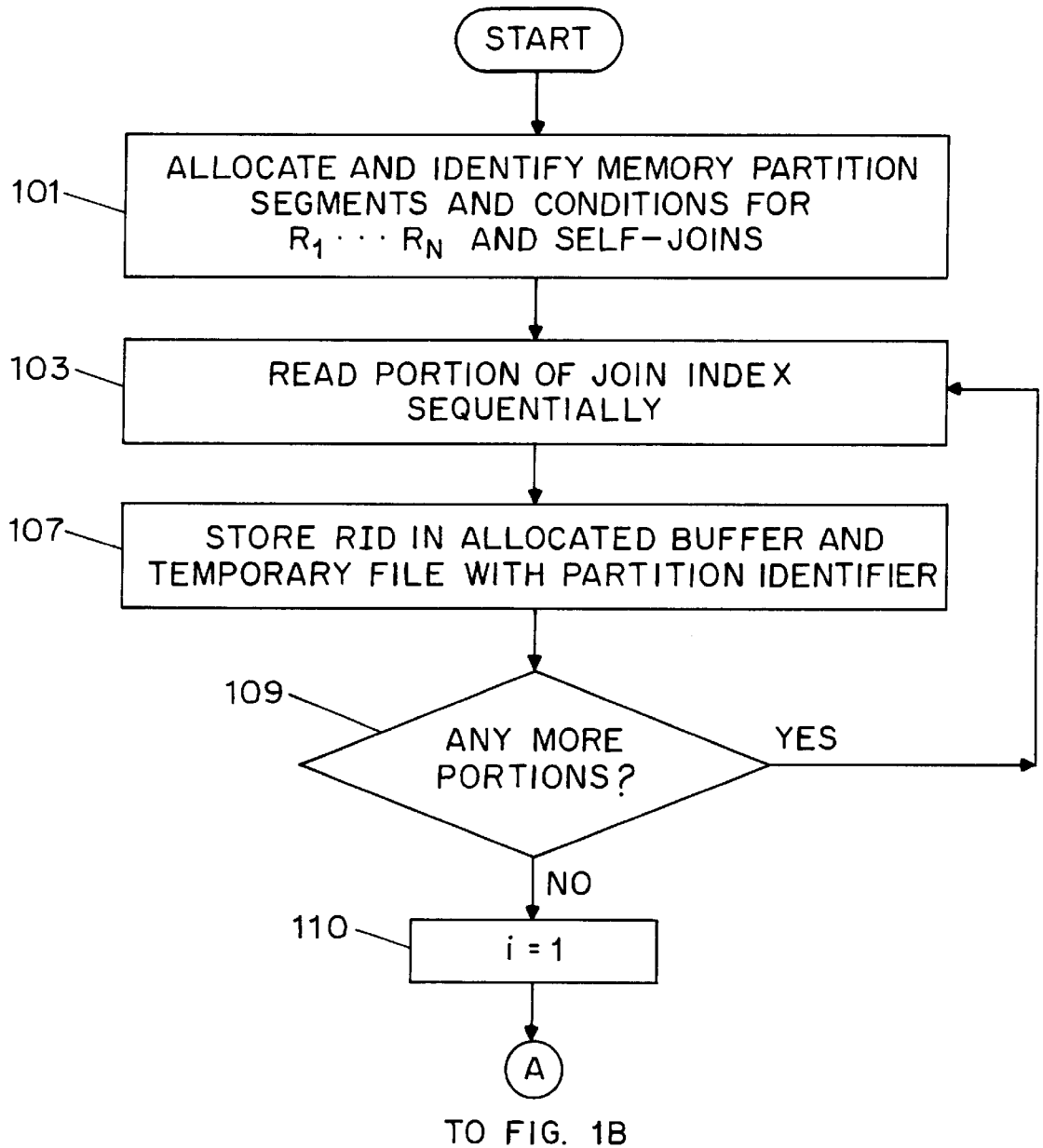
FIGS. 1A and 1B are a flow chart of the stripe-join method in accordance with the invention.
Figure 1B:
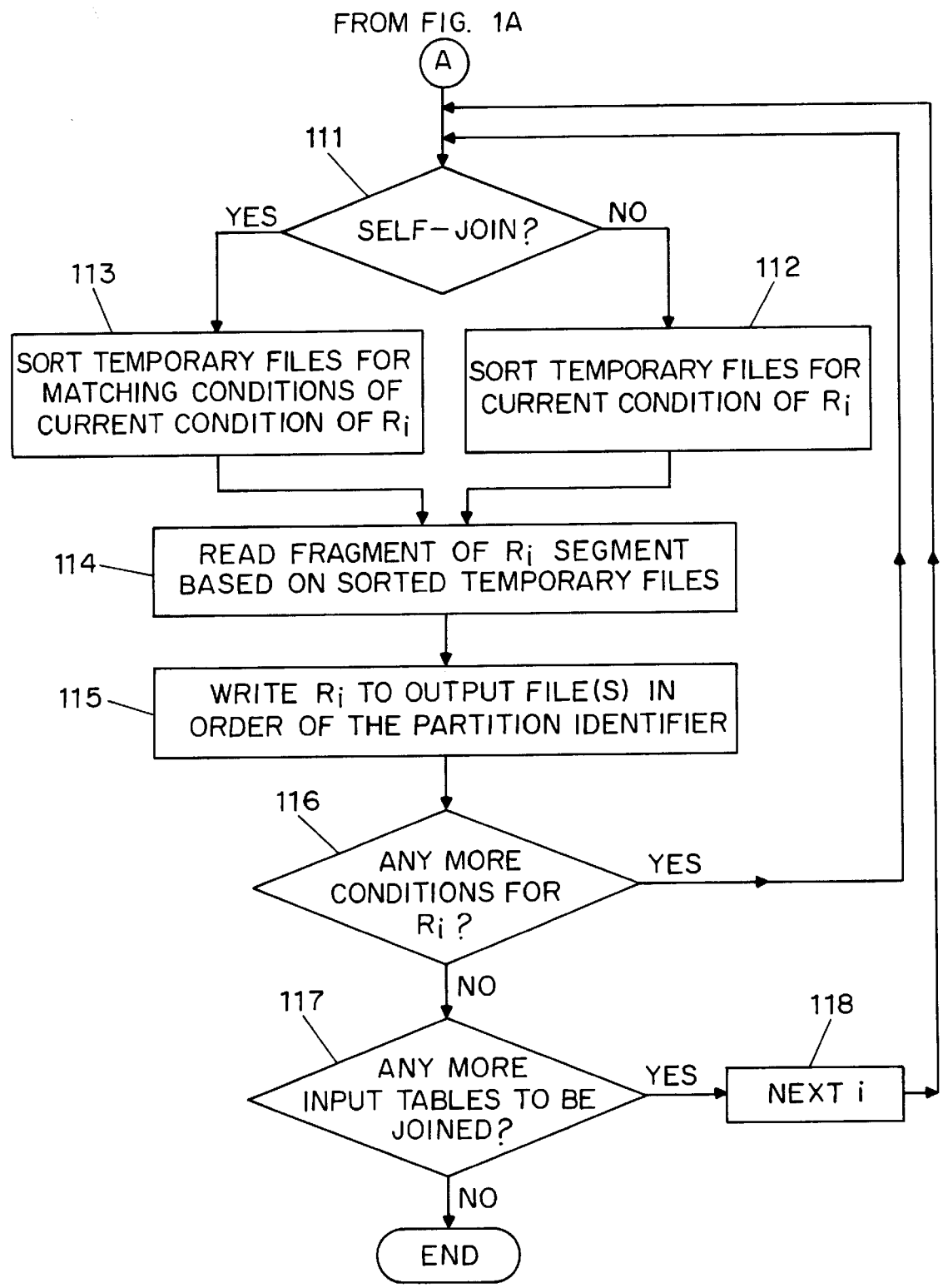

FIGS. 1A and 1B are a flow chart showing the steps performed in the stripe-join technique for joining tables. The technique can be used for joining one or more tables together (a self-join is performed by joining two columns within the same input table). The tables will be designated $R_i$ where i is the table number and there are N tables. Each table may be stored on a separate external storage medium if required due to the large size of the tables. Step 101 allocates the available main memory used by the processor into output partitions (also referred to as simply "partitions") with partition identifiers and assigns conditions for each partition, such that all the unique records fulfilling each partition condition will subsequently fit into available main memory at one time in a buffer. The buffers themselves will only hold a portion of these selected records as explained below. Main memory is a relatively fast access memory associated with a central processor; main memory is preferably RAM. Available main memory is that portion which is not allocated to another function or to another user in a multi-user computer system. The number of output partitions is determined by the total number and size of unique selected records to be read from each input table. That number can be easily calculated from the join index. The output partitions will be cross-allocated with respect to each input table's records. The number of output partitions created will be the product of the relative size of the records to be read from each input table to the size of main memory. For example, if the number of records read in the first input table is three times as large as available main memory and the number of records to be read in the second input table is twice as large as available main memory, six partitions will be created (3×2=6). Some portion of the main memory is reserved for more efficient sorting operations which will decrease the size of available main memory which can be partitioned by that portion.

If a self-join is required, the individual columns in the tables being joined will have their own conditions and partitioning. However, the conditions for each column will be identical because the same file is being read in for the join.

Figure 2B:
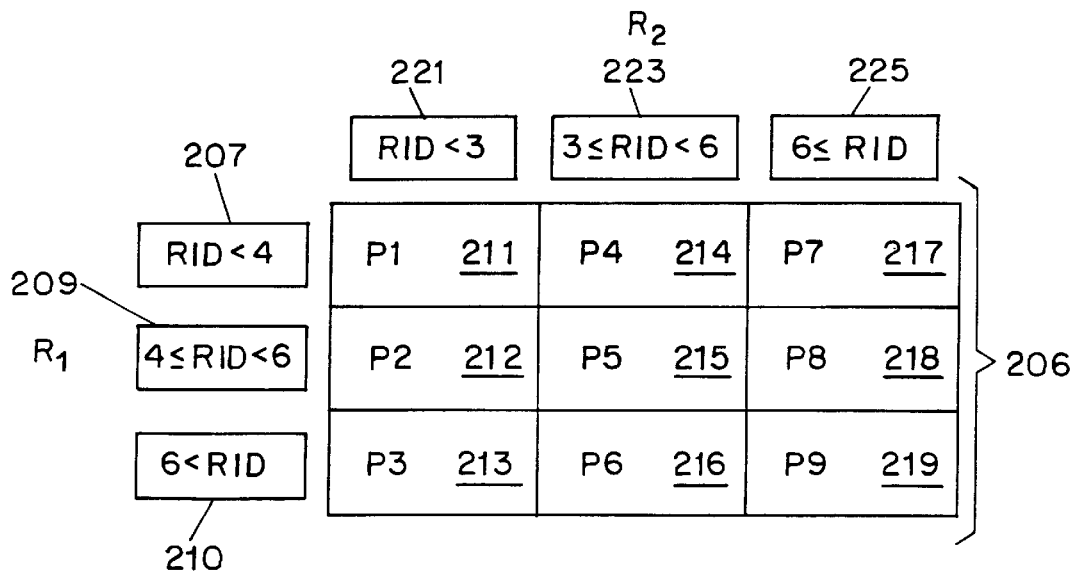
FIG. 2B is a graphical representation of a partitioning scheme used in the stripe-join method when joining the two tables in FIG. 2A.
Figures 4, 5:
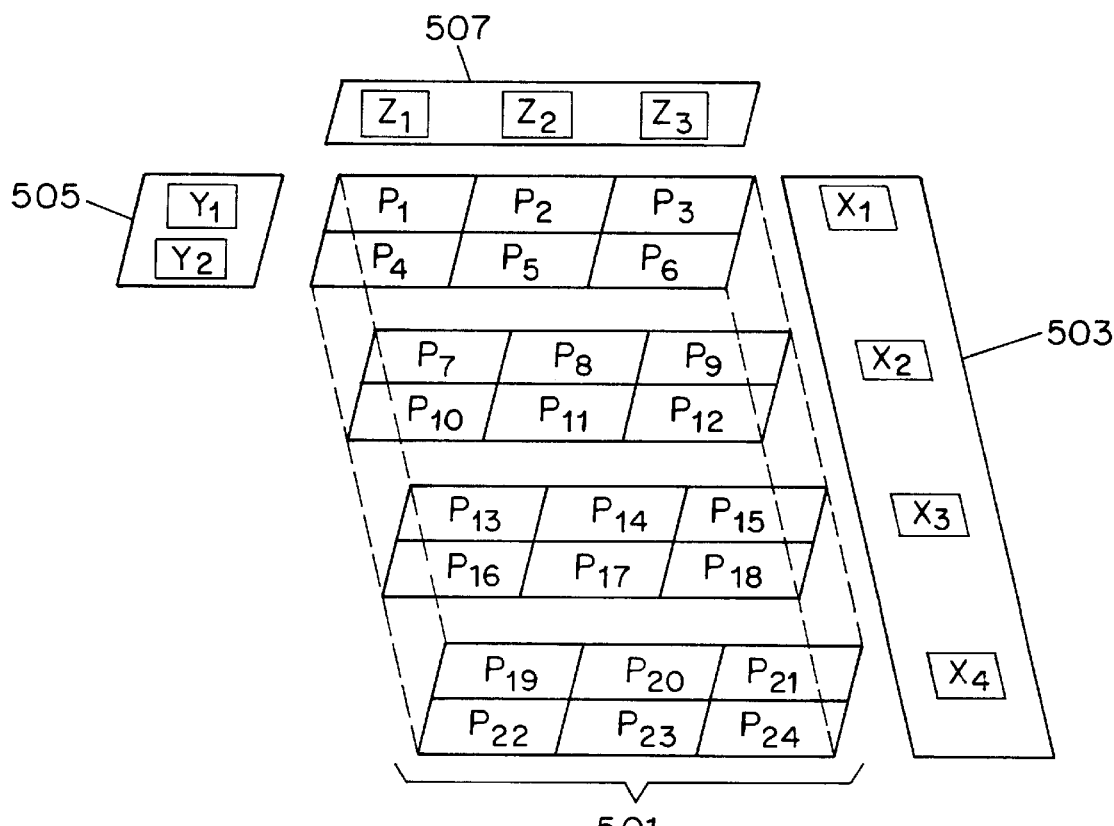
FIG. 4 is a graphical representation of the join result of the two tables in FIG. 2A.
FIG. 5 is a graphical representation of a multi-dimensional partitioning scheme used in the stripe-join method when three tables are joined.

Each output partition is then assigned a condition based on the value of the record-identifiers (RIDs) in the join index for all input tables. The conditions ensure that each of the group of partitions satisfying a condition (assigned to a buffer in a later step) will receive a substantially equal number of participating records from each of the input tables. The allocation scheme is described in detail below. Examples of these allocations are shown in the discussion of FIGS. 2B and 5.

Each output partition is assigned a unique identifier which will be used later in the technique. The identifier can be a real or virtual address, pointer or any other means to identify an allocated partition.

Step 103 reads a portion of the entries in the join index sequentially into main memory. The join index lists groups of related records between all the input tables which will be associated in the join result. The join index indicates the record's RID (record identifier—namely a record's physical or virtual location) of the related records in their tables. For example, the index (1,3,5) indicates that the first record of the first table is related in the join result to the third record of the second table and to the fifth record of the third table. While this example shows the record RID's to correspond to positions in the table, in practice record RID's contain a disk block pointer and an offset value of the record within the block. The join index will be used to read in the input tables sequentially and preserve the required relationships for the join result between the input tables.

The input tables and join index are stored in a mass storage medium. A mass storage medium is defined as any storage medium besides the designated main memory and could be located separate from the computer housing or in the same physical structure which contains main memory. The mass storage medium may be a disk.

Step 107 writes the join index record numbers for each input table to a buffer, and a partition temporary file when the buffer is full, according to the join index RID number. Also written with the join index RID is the partition identifier indicating in which partition the join index RID belongs. For example, if a join index record (1,3,4) was read for a join of three tables, and the RID has fulfilled the conditions for partition #2 in the partitioning scheme, then the value "1,2" would be written to a temporary file (through a buffer) for the first input table; "3,2" would be written to the appropriate temporary file (through a buffer) for the second input table; and "4,2" would be written to the appropriate temporary file (through a buffer) for the third input table. FIGS. 2A–D, 3 and 4 together show an example of the operation of the entire technique. When a buffer which stores pairs of RIDs and partition identifiers becomes full because there is no more available allocated memory for that buffer remaining, the data is "flushed" or written to a mass storage disk at a predefined location for a temporary file. After a buffer is flushed, the buffer can then accept additional data from the input table.

Step 109 checks if there are any more portions of the join index to be read. If there are remaining portions, the technique jumps to step 103. If the join index has been completely read and processed, then the technique goes to step 110. At this point in the technique, all of the join index has been processed and stored in the appropriate temporary file with the corresponding allocated partition identifier. After a final flushing of the buffers, the buffers themselves will now be empty.

Initially, a first input table is chosen to be processed (i=one) as described in step 110. The order of processing of the input tables does not have an effect on the efficiency of the stripe-join technique. This feature allows for maximum flexibility in processing order and is an important advantage of the technique. After the join index is processed, each input table can be processed simultaneously to increase the efficiency of the join technique. Steps 111 through 118 will be used to process all the input tables $R_1$ through $R_N$ and process self-joins.

Step 111 checks if a self-join is required for the input table $R_i$. If a self-join is required, the technique continues with step 113. If a self-join is not required for $R_i$, the technique continues with step 112.

Step 112 reads in turn the temporary files corresponding to an input partition for the input table being processed, which is a group of temporary files associated with one condition for an input table. The temporary files for each input table contain record identifiers from the join index coupled with the partition identifier for the particular join index entry. The temporary files are read into memory and each input partition (associated group of temporary files) is sorted by the appropriate RID. The original temporary files in the input partition are preserved for later use. The sort routine places the appropriate RIDs from the temporary file in numerical order. The RIDs can be sorted with any known technique, such as a quick-sort routine which is well known in the art. Output files corresponding to each buffer input partition for each input table are created on a mass storage medium. The technique continues with step 114.

Step 113 reads the temporary files with the same condition for $R_i$ corresponding to the input partition (i.e., buffer) being processed. By reading in the files with the same conditions, the two files can be sorted simultaneously and the input table can be read once. This is an important advantage over having to read the same input twice, once for each column. The RIDs are sorted and duplicates removed. FIG. 6 shows an example of the self-join operation. The process continues with step 114.

For each input table number i, $R_i$ is read sequentially into main memory reading only RIDs in the sorted temporary file in step 114. Only disk blocks containing records present in the join index and therefore needed for the join result are read. If a record in $R_i$ is not in the join index, that record should not be present in the join result, and a disk block is therefore not read into main memory if the records contained therein are not selected records. Sequential and discriminate access of disk blocks helps reduce I/O operations and time costs due to seek/rotational latencies.

The records of $R_i$ are then written to the corresponding output file in the order of the partition identifiers that correspond to the RID of the read record in the original temporary file(s) in step 115. The original temporary file(s) preserve the order of each $R_i$ record partition identifier within the join index to produce a consistent ordering of the desired join result. The output files are categorized by partition identifier for proper ordering for the output of the join result. The output files for $R_i$ are then joined together for each input table in the order of the partition identifiers by pointers connecting the end of each file with the beginning of the next. Thus the join result is vertically fragmented in that each input file will correspond to a single connected output file or, in the case of a self-join, one input table can correspond to multiple output files depending upon the columns joined.

Step 116 checks if there are remaining input partitions (corresponding to a distinct group of partitions fulfilling a condition for $R_i$) which have not been processed. If there are more input partitions for $R_i$, then the technique jumps to step 111. If all the input partitions (and thus corresponding buffers) have been processed for $R_i$, then the technique continues with step 117.

Step 117 checks if there are any more tables to be joined which have not yet been read. If there are no more tables, then the technique is done; all tables are joined and the results appear vertically fragmented and in the order of the partition identifiers in the output files. The partition identifier order ensures that each output file is ordered to produce the join index result. If other tables remain to be joined, then i is incremented in step 118 and the temporary files for the input partitions of the next table are sorted with the partition identifier and steps 111 through 116 are repeated.

The final join result will be vertically fragmented for each joined table in that each input table will have a separate output file or group of files for the join results for that table. The separate output files will be in the order of the partition identifiers for each input table. Vertical fragmentation allows each record of the input tables to be written out from main memory only once which minimizes the I/O operations.

FIGS. 2A–2D, 3 and 4 are graphic depictions of an example where the stripe-join technique is applied to perform a join operation on two tables in a database system. The data is organized into tables of related data. The example is only illustrative and is not meant to limit the scope of the invention. An example of a self-join operation on the same table will be described in the discussion of FIG. 6.

FIG. 2A shows a first input data table 201 which includes columns of data entitled Student name 201A and their Course number 201B. Also included with table 201 is a column of sequential record identifiers 201C which shows the order of the records in this example. A set of numbers 201C do not in practice appear with the table 201, but are present only for this explanation. Table 205 is a table to be joined with table 201 and includes columns of data entitled course number 205A and its instructor 205B. Also included for this explanation is a column of sequential record identifiers 205C which shows the order of the records in this example. The data contained in the two tables are to be joined together producing a join result only of records of each table which fulfill a desired join condition. For this example, only records from first table 201 which have the same course number as records in second table 205 will be in the join result. Additionally, all columns in first table 201 and second table 205 will be present in the join result so that the join result will have a student column, a course column and an instructor column. It is also possible to select only some of the columns from the input tables to become part of the join result.

The join index 203 shows pairs of related records which will be present in the join result. The join index is considered to be pre-existing for use with the stripe-join technique, although a join index can be created if needed by conventional techniques. The join index contains a first column 203A of the record identifiers of the first table 201 records to be joined, a second column 203B of the record identifiers of the second table 205 records to be joined, and a third column 203C included only for this explanation, which is a column of sequential record identifiers 205C to show the order of the records. Each entry in each record in the join index is called a record identifier value. The record identifier values do not need to be in any sorted order. This is an advantage over the jive-join and slam-join techniques previously described. Column 203B is thus made of second table 205's RID values. In this example, the join index represents matches of the course number of the student from table 201 with the course number of the instructor in table 205. In this example we assume that one record occupies one disk block. In practice, it is typically the case that many records fit in each disk block.

FIG. 2B shows the partition allocation result of the stripe-join technique applied to the input tables in FIG. 2A, which is shown to help explain the stripe-join technique. First, partitions are created from the available main memory and allocated based upon the sizes of the unique records to be joined from first table 201 and second table 205 compared to the size of available main memory. Input partitions are formed from a group of partitions fulfilling the same condition for a single input table. Portions of the main memory may be reserved for temporary files and are not considered part of available main memory. In the example, available main memory is capable of holding three full records at one time and all the records are the same size. The records could be varied in size depending on the type of data and number of columns. From the join index, it is determined that first table 201 will have eight distinct records in the join result which will be read in (the sixth record is used twice and the ninth record is not used at all), which is approximately three times larger than main memory. Also from the join index, it is determined that second table 205 will have eight distinct records in the join result which will be read in (the second record is used twice and the eighth record is not used at all), which is approximately three times larger than main memory, so nine partitions (3×3) will be created where each input table has three input partitions (i.e., three separate defined conditions). Although the join result will have nine records from each input table, only eight records will be read from $R_1$ and $R_2$ because one record is used twice in each case. If fewer partitions were used, the allocation would be insufficient because the number of records associated with each buffer will exceed the three record limit. When this example is extrapolated out to actual size contemplated for use, it is expected that thousands, millions, or even billions of records would be processed. All the records associated with one input partition must be able to fit into the available main memory at one time for processing. The partitions are allocated according to conditions determined for each input table's join index RID values in order to distribute the records of all the input tables between the nine buffers. The first table 201 RID values appear in the join index 203 in column 203A which indicate the record identifiers of the records to be included in the join result. The second table 205 RID values appear in the join index 203 in column 203B which indicate the record identifiers of the records to be included in the join result. The determination of the exact conditions associated with each input partition based upon the RIDs are described below. The allocation can be determined to substantially equally distribute each tables's RIDs using the join index.

Table 206 in FIG. 2B shows a table indicating the allocated partitions and the RID conditions for the two input tables. The partitions are designated as P1 211, P2 212, P3 213, P4 214, P5 215, P6 216, P7 217, P8 218 and P9 219. Each partition's identifier will be used later in the technique. In this example, the conditions for the first input table are the following: condition 207 is satisfied when the first table RID form the join index is less than four; condition 209 is satisfied when the first table RID from the join index is greater than or equal to four and less than six; condition 210 is satisfied when the first table RID from the join index is greater than or equal to six. The conditions for the second input table are the following: condition 221 is satisfied when the second table RID from the join index is less than three; condition 223 is satisfied when the second table RID from the join index is greater than or equal to three and less than six; condition 225 is satisfied when the second table RID from the join index is greater than or equal to six. In this example, the condition for both tables for the first partition P1 211 is defined as the first table 201 RID is less than or equal to four (shown as condition 207) and the second table 205 RID is less than or equal to three (shown as condition 221). Identifying another partition, the condition for the fifth partition P5 215 is defined as the first table 201 RID is greater than or equal to four and less than six (shown as condition 209) and the second table 205 RID is greater than or equal to three and less than six (shown as condition 223). The partitions are allocated so that the aggregate size of the participating records for each input partition will be close to but not greater than the size of available main memory, and an input partition is defined as all the partitions related to one condition for an input table.

The next step in the stripe-join technique is to read the join index into main memory. Each join index RID is written to an appropriate buffer based on the RID values and conditions for all the input tables. When a buffer is full, its contents are "flushed" to a corresponding temporary file. Also written to the buffer and temporary file with the RID will be the partition identifier representative of the assigned partition to which the join index RID is placed. The partition identifier is based on intersection of the conditions for all the input tables participating in the join. The number of buffers is the number of predetermined conditions for all the input tables.

Figure 2C:
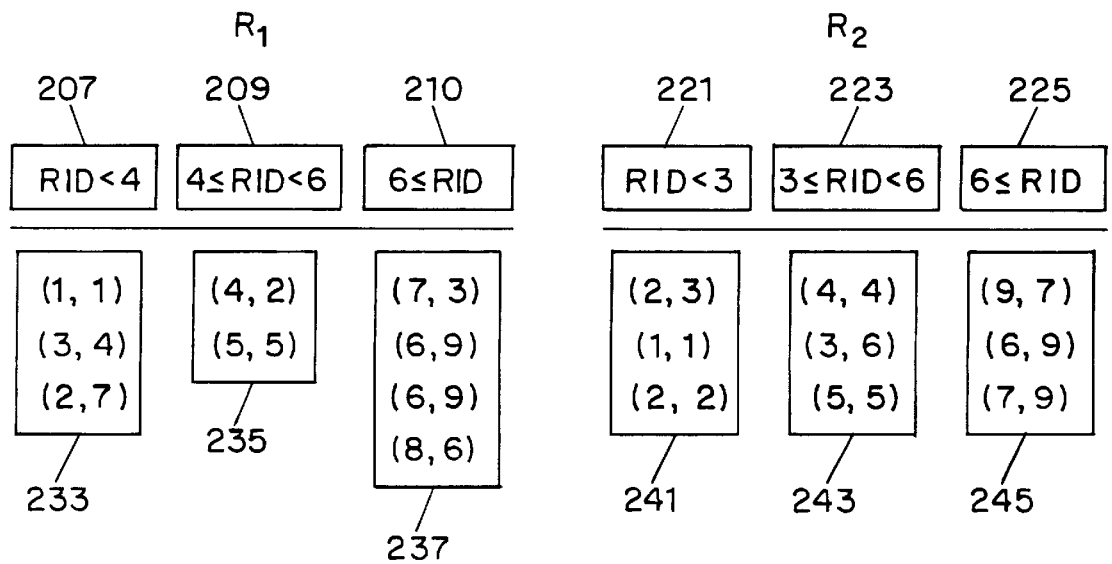
FIG. 2C is a graphical representation of part of the intermediate files created during the stripe-join method when joining the two tables in FIG. 2A.

FIG. 2C shows the buffers and temporary files for the first input table 201 and second input table 205 and their input partitions based on the input table's conditions. In this case, six buffers have been allocated based on the number of conditions in the segmentation step. The buffers write their contents to a temporary file when full so the buffer and corresponding temporary files will have the same designation. Temporary file 233 (whose contents start out in an allocated buffer) shows the temporary file for first condition 207 for first table 201. Temporary file 235 shows the temporary file for second condition 209 for first table 201. Temporary file 237 shows the temporary file for third condition 209 for first table 201. The three temporary files 233, 235 and 237 make up all the join index entries for the first input table. Temporary file 241 shows the temporary file for first condition 221 for second table 205. Temporary file 243 shows the temporary file for second condition 223 for second table 205. Temporary file 245 shows the temporary file for third condition 225 for second table 205. Temporary files 241, 243 and 245 make up all the join index entries for the second input table. Each join index RID is accompanied by the partition identifier of the partition to which the join index entry (relating to all the input tables) belongs. For example, temporary file 233 contains all the join index entries which are less than four. The first entry (1,1) corresponds to second listed join pair in join index 203. The first "1" is the index RID for the first input table and the second "1" is the partition where the join index (1,1) belongs according to the conditions for both input tables. The second entry (3,4) corresponds to the third join pair in join index 203. The first "3" is the index RID for the first input table and the second "4" is the partition where the join index (3,4) belongs according to the conditions. The third entry (2,7) in temporary file 233 corresponds to the fourth join pair in join index 203. The first "2" is the index RID for the first input table and the second "7" is the partition where the join index (3,4) belongs according to the conditions. There is no direct information concerning the second input table stored in temporary file 233.

When a join pair is processed, the RID for the second table is also placed in a temporary file based on a condition along with the proper partition identifier. The first entry (2,3) in temporary file 241 corresponds to first listed join pair in join index 203. The first "2" is the index RID for the second table and the second "3" is the buffer where the join index (1,1) belongs according to the conditions. Thus because the join pair (7,2) from the join index 203 belongs in the third input partition for the first table (7 is greater than or equal to six) and the first input partition for the second table (2 is less than 3), and the designated partition is P3 213. The second entry (1,1) corresponds to the second join pair in join index 203. The first "1" is the index RID for the second input table and the second "1" is the partition where the join index (1,1) belongs according to the conditions. The third entry (2,2) in temporary file 233 corresponds to the sixth join pair in join index 203 (4,2). The first "2" is the index RID for the second input table and the second "2" is the partition where the join index (4,2) belongs according to the conditions.

The six buffers corresponding to the temporary files described above are located in main memory at the same time while the join index is being processed, and since main memory in this example will only hold three records at one time, the contents of the buffers will need to be transferred to the temporary files when the available main memory is full. The buffer is flushed to a temporary file (or output file later in the technique) and cleared of data and ready to accept more data from the input tables. The number of times each buffer will be flushed will depend on the allocated buffer size and the size of the input tables. Each time a buffer is flushed, it is written to a disk location for a file following the previous flush for that segment of buffers. The segments can contain a set of pointers to manage the file. The files associated with the output of the buffers located on the disk are called temporary files or output files, depending on when written to in the techniques.

Figure 2D:
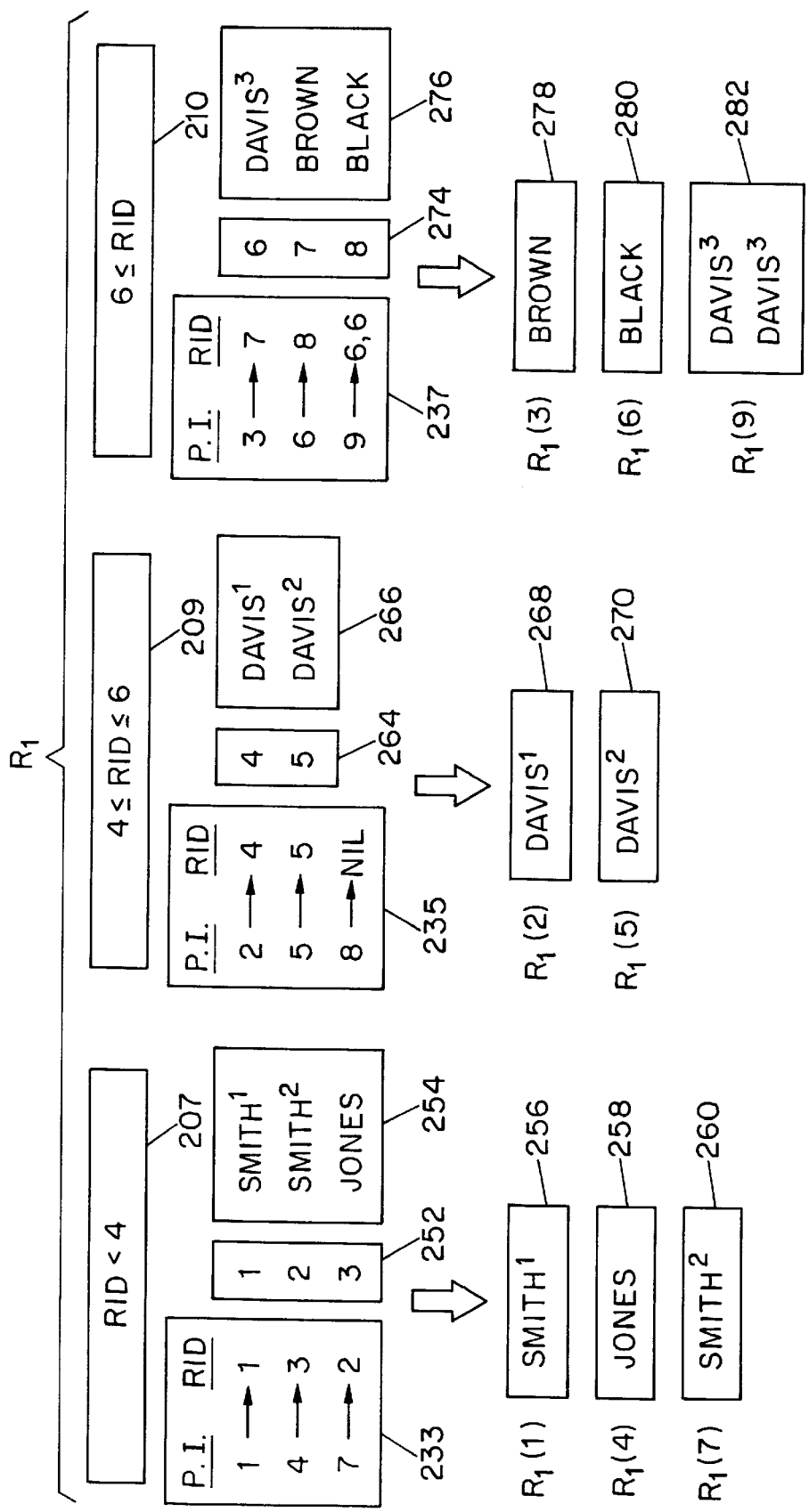
FIG. 2D is a further graphical representation of part of the intermediate and outputs files created during the stripe-join method when joining the two tables in FIG. 2A.

FIG. 2D shows the intermediate results of the next steps in the stripe-join technique applied to the tables in FIG. 2A. The technique continues by reading the temporary files 233, 235 and 237 which include the first table 205 RIDs already partitioned by condition. Each temporary file is then sorted by the RID number, reads in the appropriate record from the designated input table (or group of records containing the appropriate record), organizes the records by the partition identifier for each RID and stores each record in an output file associated with its partition identifier. Temporary file 233 (containing RID and partition identifier pairs) is read and sorted by the first table 201 RIDs, duplicates of the first table 201 RIDs from file 233 are eliminated and the results of the sort appear in file 252 which is located in main memory. The original temporary file 233 with the partition identifier information is preserved although rearranged by partition ID. Box 254 shows the corresponding entry from the first table indicated by the RID in file 252. The superscripts correspond back to the input tables in FIG. 2A. The records from first table 201 are then read sequentially in data blocks based upon the sorted first table 201 RIDs. Because the first table 201 values have been previously partitioned in the temporary files which are associated with each partition based on the defined conditions 207, 209, and 211, the participating first table 201 records with RID values in the lowest third of all the first table's RIDs will be read at this time. The selected records of first table 201 are then placed in available memory. The records will be written to the corresponding output file in the order of the partition identifiers (file 233). By writing in the partition identifier order, the records from the other input tables can be matched up with the other input tables while being processed separately. This allows for advantageous parallel processing as well as limiting the number of times an input table is required to be read or written. If the unsorted temporary file lists a first table 201 RID multiple times, the selected first table 201 record will be written to the output in each of those places identified by the first table 201 RID.

The remaining temporary files for the first input table are then processed in the same manner. Temporary file 235 is read and sorted by the stored first table 201 RIDs and the results of the sort are shown in file 264 located in RAM. Any duplicates of first table 201 RIDs are eliminated. The records of first table 201 are again read sequentially in the buffer starting at the lowest first table 201 RID associated with the particular partition (in this example the lowest RID is "4"). The records are then written to the corresponding output file in the order of the buffer identifiers associated with each RID. The same process is performed for temporary file 237 with the results of the sort stored in file 274 located in RAM. File 276 shows the records read in from the first input table.

The results of processing the first input table 201 are written in the order of the corresponding partition identifiers to the join result output files 256, 258, 260, 268, 270, 278, 280 and 282. The files are then connected through file pointers in the order of the partition identifiers. Alternatively, the files can be organized by a separate file structure indicating the position of the fragments on disk and their order. A pointer (pointers not shown) is located at the end of output file 256 pointing to the beginning of the output file 268. A pointer is located at the end of output file 268 to the beginning of file 278. A pointer is located at the end of output file 278 pointing to the beginning of the output file 258. A pointer is located at the end of output file 258 to the beginning of file 270. A pointer is located at the end of output file 270 pointing to the beginning of the output file 280. A pointer is located at the end of output file 280 to the beginning of file 260. A pointer is located at the end of output file 260 pointing to the beginning of the output file 282. The first table 201 output files when taken together form the join result for columns from the first table 201.

Figure 3:
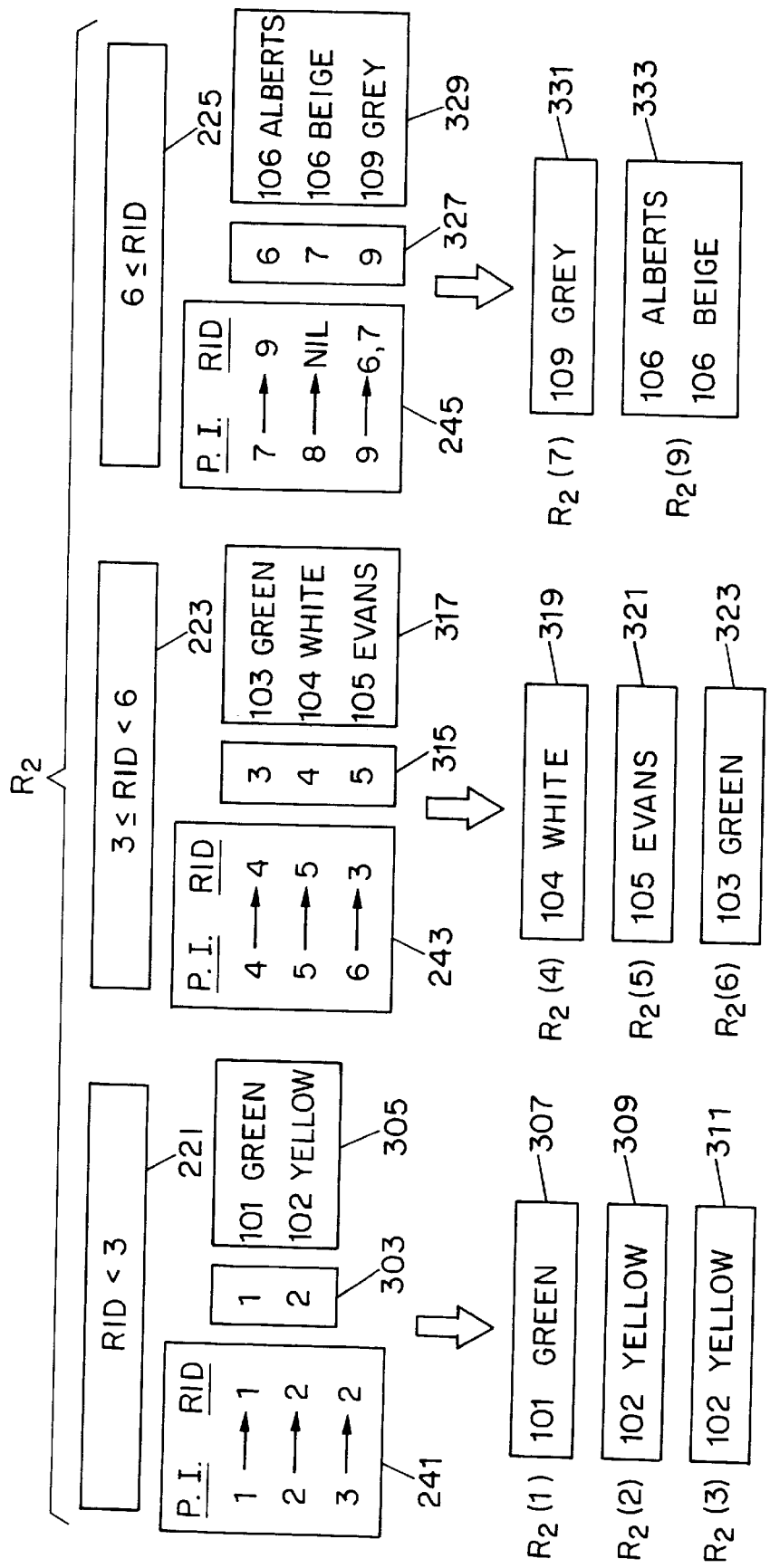
FIG. 3 is a further graphical representation of part of the intermediate and outputs files created during the stripe-join method when joining the two tables in FIG. 2A.

The second table temporary files are then processed and the intermediate values for the second input table are shown in FIG. 3. This processing could be performed in parallel with the first and other input tables. The order of the table processed does not affect the efficiency of the technique. The technique continues by reading the temporary files 241, 243 and 245 which include the second table 205 RIDs already partitioned by condition. Each temporary file is then sorted by the RID number, reads in the appropriate record from the designated input table, organizes the records by the partition identifier number in the RID pair and stores each record in an output file. Temporary file 241 is read and sorted by the second table 205 RIDs, duplicates of the second table 205 RIDs from file 241 are eliminated and the results of the sort appear in file 303 which is located in main memory. The original temporary file 241 is preserved. Box 305 shows the corresponding entry from the second table indicated by the RID in file 303. The records from second table 205 are then read sequentially in data blocks based upon the sorted second table 205 RIDs. Because the second table 205 values have been previously partitioned in the temporary files which are associated with each partition based on the defined conditions 221, 223, and 225, the participating second table 205 records with RID values in the lowest third of all the second table's RIDs will be read at this time. The selected records of second table 205 are then placed in available memory in a allocated buffer. The records will be written to the corresponding output file for the buffer in the order of the partition identifiers (shown in file 241). By writing in the partition identifier order, the records from the other input tables can be matched up to other input tables while being processed separately. This allows for advantageous parallel processing as well as limiting the number of times an input table is required to be read or written. If the unsorted temporary file lists a second table 205 RID multiple times, the selected second table 205 record will be written to the output in each of those places identified by the second table 205 RID.

The remaining temporary files for the second input table are then processed in the same manner. Temporary file 243 is read and sorted by the stored second table 205 RIDs and the results of the sort are shown in file 315 located in RAM. Any duplication of second table 205 RIDs are eliminated. The records of second table 205 are again read sequentially in the buffer starting at the lowest second table 205 RID associated with the particular partition (in this example the lowest RID is "3"). The records are then written to the corresponding output file in the order of the buffer identifiers associated with each RID. The same process is performed for temporary file 245 with the results of the sort stored in file 327 located in RAM. File 329 shows the records read in from the second input table.

The results of processing the second input table 205 are written in the order of the corresponding partition identifiers to the join result output files 307, 309, 311, 319, 321, 323, 331 and 333. The files are then connected through file pointers in the order of the partition identifiers. Alternatively, any other method which indicates the proper order such as a separate file structure can be used. In this example, a pointer (pointer not shown) is located at the end of output file 307 pointing to the beginning of the output file 309. A pointer is located at the end of output file 309 to the beginning of file 311. A pointer is located at the end of output file 311 pointing to the beginning of the output file 319. A pointer is located at the end of output file 321 to the beginning of file 323. A pointer is located at the end of output file 323 pointing to the beginning of the output file 331. A pointer is located at the end of output file 331 to the beginning of file 333. The second table 205 output files when taken together form the join result for columns from the second table 205.

Note that the first table 201 join result files when connected sequentially correspond with the second table 205 join result output files, and would form a table if the output columns were concatenated. The output of the join result is vertically fragmented because the output for each input table is stored separately. The vertical fragmentation allows a reduced number of I/O transfers and decreases required processing time by processing the records of each input table separately and only reading and writing the records from first table 201 and second table 205 once.

FIG. 4 shows a table representation 400 of the join result for first table 201 in column 401 and the join result for second table 205 in column 403. Since the course column appears in both input tables 201 and 205, the course column could have been included with either output file. The superscripts show the positioning of a particular entry from the input tables where duplicate names occur. By ordering the output files by the output partition identifiers, the records for each input table match up in their separate output files to form the proper join result.

The stripe-join technique also applies when the number of tables to be joined is greater than two. The steps of the technique described in FIG. 1 apply when there are one or more tables (including performing a self-join). The partitioning scheme with three or more input tables is expanded from the previous example of joining two tables in order to allow additional tables to be joined. The partitions are divided by conditions on the RIDs for every input table to be joined. An example of a partition scheme used when three tables are to be joined is shown in FIG. 5.

FIG. 5 shows a partitioning scheme example for joining three tables ($R_1$, $R_2$ and $R_3$) that is displayed as a cube 501 containing 24 partitions P1 through P24. The partitions are represented in the figure as blocks with an overall dimension of 4×2×3 (corresponding to four conditions times two conditions times three conditions). The join index entries for each input table are partitioned by the $R_1$. RIDs, $R_2$ RIDs and $R_3$ RIDs. Along one side of the cube 501 are the determined conditions 503 (represented as conditions X1, X2, X3 and X4) for sorting the join index RIDs of $R_1$. The conditions are determined to distribute the join index entries for $R_1$ among the four input partitions for $R_1$. Along another side of the cube 501 are the determined conditions 505 (represented as Y1 and Y2) for sorting the join index for the $R_2$ entries. The conditions are determined to equally distribute the join index entries for $R_2$ among the two input partitions for $R_2$. Along the third side of the cube 501 are the determined conditions 507 (represented as Z1, Z2 and Z3) for sorting the join index for the $R_3$ RIDs. The conditions are determined to equally distribute the join index entries for $R_2$ among the three buffer input partitions for $R_3$.

The partitions are numbered in a systematic way from 1 to 24 in this example. However, the partitions could be numbered in any way, even randomly, as long as each partition has a unique identifier. The unique identifiers are used in the technique to allow the records from each input table to be assigned to the proper partition and be processed separately from the other input tables while ensuring that the output results are saved in the proper order by partition identifier to obtain the desired join result.

The partitioning scheme can be extended to the case of N tables to be joined by allocating input partitions with conditions for each of the input tables. Thus, when five relations are to be joined, a five dimensional partitioning scheme will be allocated based upon conditions for the values of the RIDs for $R_1$, $R_2$, $R_3$, $R_4$ and $R_5$. If each table in that example is allocated into three groupings of defined conditions, the number of subsequent partitions will be the product of the number of conditions, or 3×3×3×3×3=243. The number of subsequent buffers to place the RID and partition identifier pair will be the sum of number of input partition conditions, which would be 3+3+3+3+3=15 buffers for the given example.

The stripe-join technique is very efficient for performing self-joins. A self-join occurs when a data table contains records located in multiple columns and one column is required to be correlated with records from a different column. For example, a data table for a company can have three columns representing every employee name, the employee's salary and the employee's manager. If it is required to compare the salaries of the employees to the salaries of their manager, a join operation would be performed for the employee column with his/her salary with the manager column from the same table. Since every manager in the company is an employee, the join result would be the employee, his/her salary, the manager and his/her salary. In this example, the president would report to himself to logically complete the data table.

The technique in FIG. 1 applies for the self-join operation. Instead of reading the input table twice to process the temporary files, the temporary files corresponding to the same condition for both parts of the self-join are processed together in step 113. The conditions must be the same for both columns being joined because the columns come from the same input table. This allows the input table to be only read once for a self-join, a significant advantage over other techniques.

Figure 6A:
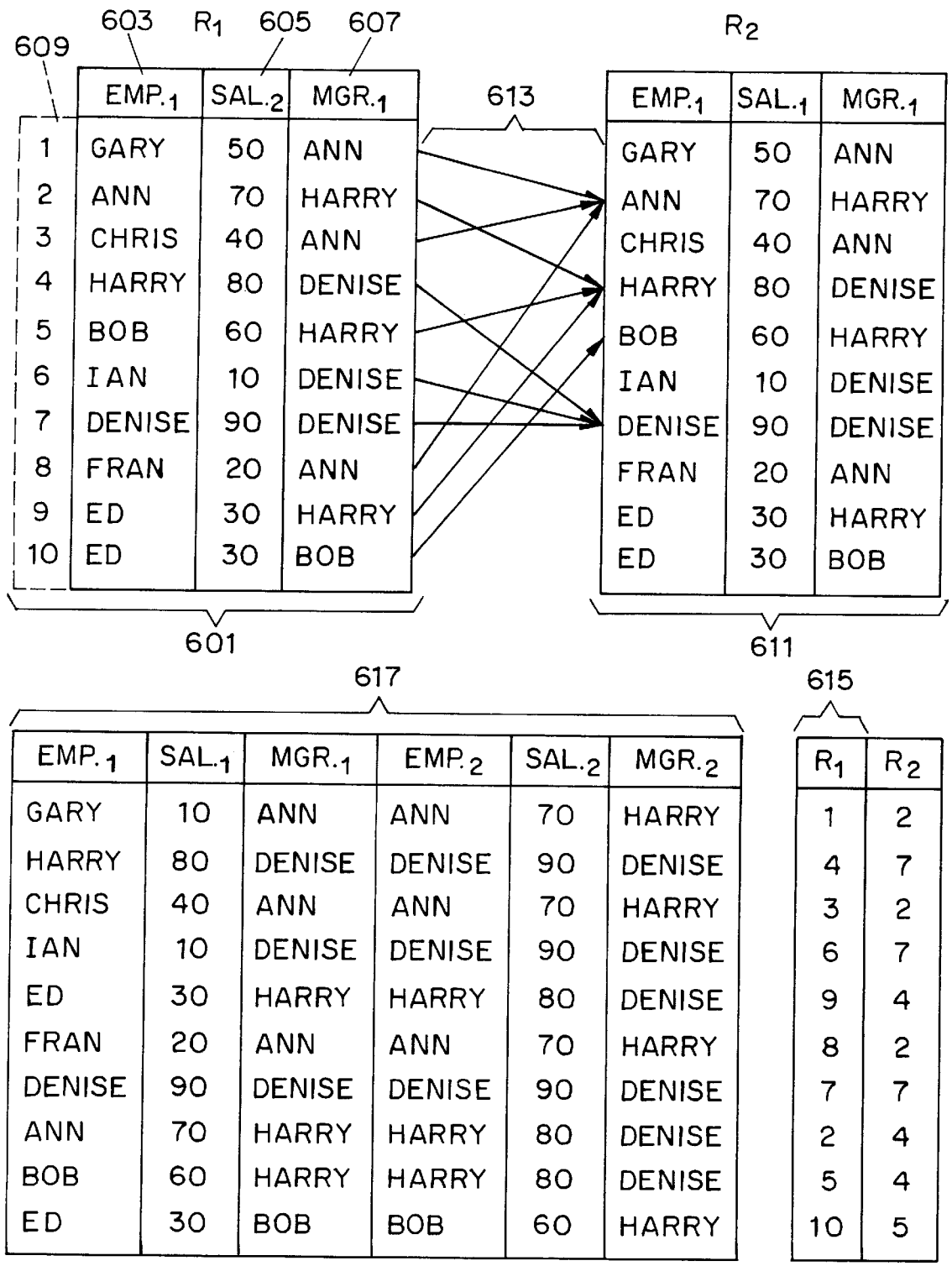
FIG. 6 is a graphical representation of an input table to be self-joined, a join index and an expected join result.
FIGS. 6B, 6C, 6D and 6E are graphical representations of part of the intermediate and output files created during the stripe-join method when self-joining the two columns from one table in FIG. 6A.
FIG. 6F is a graphical representation of the join result of the self-join of the input table in FIG. 6A.

FIGS. 6A–6F show a graphical example of performing a self-join using the stripe-join technique. The example shown in FIG. 6 is not meant to limit the scope of the invention in any way, but is merely provided to help describe the operation of the stripe-join technique for the self-join operation. FIG. 6A shows one input table upon which a self-join will be performed and a join index which shows the relationship of the records for the join result. The self-join will join one column in the table to another column. In this case, a copy of the input table is shown for descriptive purposes, but the copy would not exist as an input table in actual operation. Table 601 includes records of a company's employees, their salaries and their managers. Table 611 is a copy of table 601 that would not be actually created during the operation of the technique but is shown for descriptive purposes. The manager column in table 601 is to be joined with the employee column in the table to obtain the manager's salaries juxtaposed next to the employees salaries for a quick and easy comparison. The join index 615 has two columns which map the manager name to the employee name. The mapping is based on the relationship shown by arrows 613. The self-join operation to be performed will create a result table 617 with columns for all the employees in the company, their salaries, the employees manager, the manager's salary, and the manager's manager. Excess columns such as the repeated manager's name could be easily eliminated in the file by deleting the column when writing the result to disk.

The join index 615 showing the relationship between the table to be self-joined is either pre-existing before the stripe-join technique is performed or created with one of several possible techniques. One such technique for creating a join index can be easily extrapolated from a nested-loop technique described hereafter.

Figure 6B:
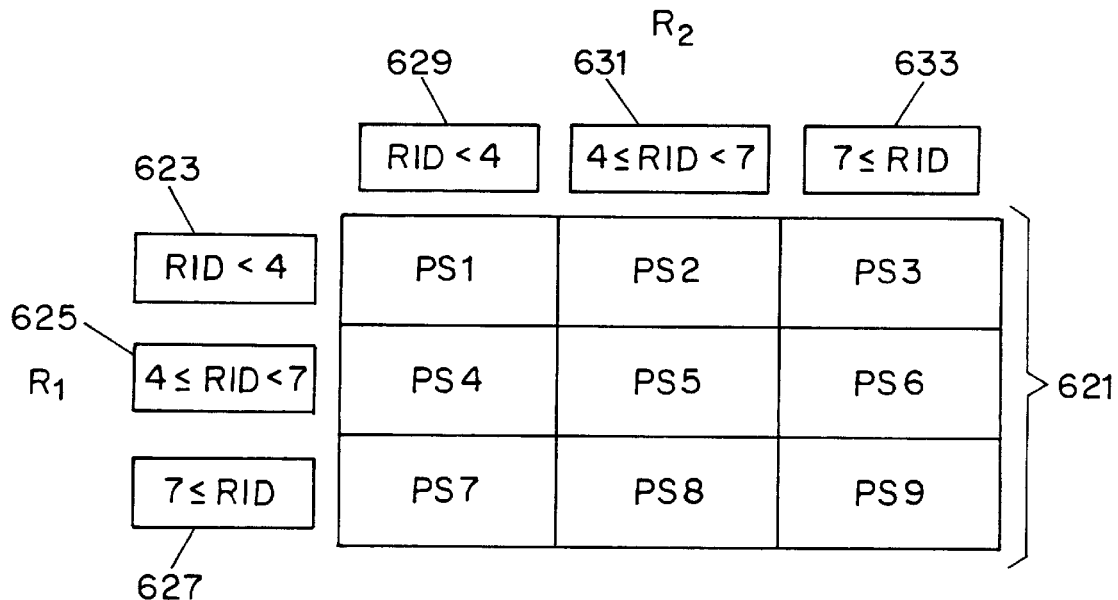

FIG. 6B shows some of the intermediate results of the stripe-join technique applied to the input table in FIG. 6A, which is being self-joined. First, partitions are created with partition identifiers and allocated based upon the size of the unique records to be joined from table 601 compared to the size of available main memory. Since a self-join is to be performed, the input table (designated $R_1$ in this example) will be joined with itself (a representation designated as $R_2$). Input partitions (also called segments) are formed from a group of partitions fulfilling the same condition for a single input table. Portions of the main memory may be reserved for sorting techniques, temporary files and reading in portions of the join index and are not considered part of available main memory. In the example, available main memory is capable of holding four full records at one time and all the records are the same size. The records could be varied in size depending on the type of data and number of columns. From the join index, it is determined that first table 601 will have ten distinct records in the join result which will be read in, which is approximately three times larger than main memory. Because the join operation is a self-join, only the first input table 601 will have its records read in once, while the partitioning and partition identifiers allows the records to be placed in the proper output position for the self-join.

In a self-join, the partition allocations must be the same for both the actual table and the duplicate table, so the second input table 611 will also have three partition segments (i.e., three conditions). Therefore, nine partitions (3×3) will be created where each input table has three segments (or three separately defined conditions). When this example is extrapolated out to actual size contemplated for use, it is expected that thousands, millions, or even billions of records would be processed. All the records associated with one segment (or input partition) must be able to fit into the available main memory at one time for processing. The partitions are allocated according to conditions determined for each input table's join index RID values in order to distribute the records of all the input tables between the nine partitions close to equally.

Table 621 shows a table indicating the allocated partitions and the RID conditions for self-joining an input table. The buffers are designated as PS1, PS2, PS3, PS4, PS5, PS6, PS7, PS8 and PS9. Each partition's identifier will be used later in the technique. In this example, the conditions for the first input table are the following: condition 623 is satisfied when the first table RID from the join index is less than four; condition 625 is satisfied when the first table RID from the join index is greater than or equal to four and less than seven; condition 627 is satisfied when the first table RID from the join index is greater than or equal to seven. The conditions for $R_2$ table must match that of the $R_1$. This will enable the input table 601 to be only read in once for the self-join operation. Therefore, $R_2$ condition 629 matches $R_1$ condition 623; $R_2$ condition 631 matches $R_1$ condition 625; and $R_2$ condition 633 matches $R_3$ condition 627. The segment allocations are symmetrical in the self-join operation. Thus in this example, the condition for both tables for the first partition PS1 is defined as the first table 601 RID is less than or equal to four (shown as condition 623) and the second table 611 RID is less than or equal to four (shown as condition 629). Identifying another partition, the condition for the sixth partition PS6 is defined as the first table 601 RID is greater than or equal to four and less than seven (shown as condition 625) and the second table 605 RID is greater than or equal to seven (shown as condition 633). The partitions are allocated so that the aggregate size of the participating partitions for each $R_1$ segment will be close to but not greater than the size of available main memory, and a segment is defined as all the partitions related to one condition for an input table ($R_1$ or $R_2$ in this example).

The next step in the stripe-join technique is to read the join index into main memory. Buffers allocated for each partition segment (corresponding to a condition for an input table) are used to store the RID/partition identifier pairs. The buffers are "flushed" when full to store the pairs in a temporary file. Each join index RID is written to an appropriate buffer and (its temporary file) based on the RID values for that particular input table. Also written to the buffer (and corresponding temporary file) with the RID will be the partition identifier to which the join index record identifier belongs according to the conditions as set out above. The partition identifier is selected based on the intersection of all the input tables RIDs participating in the join and which conditions they fulfill.

Figure 6C:
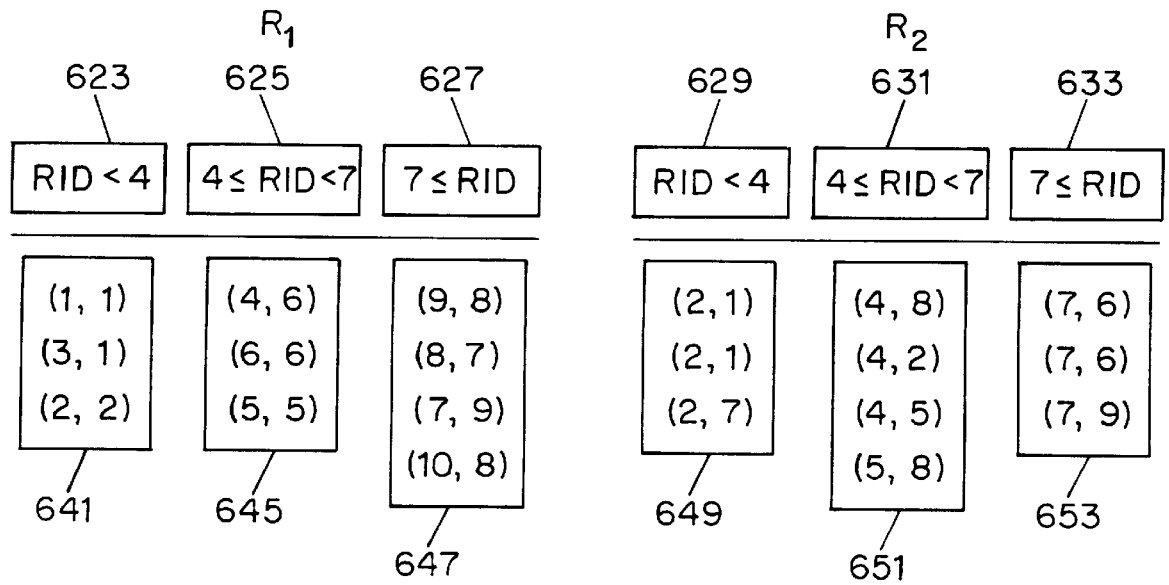

FIG. 6C shows the temporary files for each of the input tables which are partitioned based on the defined conditions. The temporary files are the results of flushed buffers which temporarily store the RID/partition identifier pair. Temporary file 641 shows the temporary file for first condition 623 for first table 601. Temporary file 645 shows the temporary file for second condition 625 for first table 601. Temporary file 647 shows the temporary file for third condition 627 for first table 601. The three temporary files 641, 645, and 647 include all the join index entries in the join index for the first input table. Temporary file 649 shows the temporary file for first condition 629 for second table 611. Temporary file 651 shows the temporary file for second condition 631 for second table 611. Temporary file 653 shows the temporary file for third condition 633 for second table 611. Temporary files 649, 651, and 653 include all the join index entries in the join index for the second input table. Each join index entry is accompanied by the partition identifier of the partition to which the join index entry relating to all the input table belongs. For example, temporary file 641 contains all the join index entries for the first input table which are less than four. The second entry (3,1) corresponds to the third listed join pair in join index 603. The first "3" is the index RID for $R_1$ and the second "1" is the partition where the join index (3,1) belongs according to the conditions. There is no direct information concerning $R_2$ in temporary file 641.

When a join pair is processed, the RID for the second table is also placed in a temporary file based on a condition along with the proper partition identifier. The third entry (2,7) in temporary file 649 corresponds to the sixth listed join pair in join index 603. The first "2" is the $R_2$ index RID and the second "7" is the partition where the join index (2,7) belongs according to the conditions. Thus, because the join pair (8,2) from the join index 203 belongs in the third segment for $R_1$ (7 is greater than or equal to seven) and the first segment for $R_2$ (2 is less than four), the designated buffer is PS7.

The six buffers corresponding to the temporary files are located in main memory at the same time, and since main memory in this example will only hold four records at one time, the contents of the buffers will need to be stored in the temporary files outside of available main memory when the available main memory is full. When a buffer reaches its maximum storage allocation when being written to with join index RIDs, the data in the buffer is "flushed", or written to a mass storage disk at a predetermined location for a temporary file. The buffer is then cleared of data and ready to accept more data from the input tables. The number of times each buffer will be flushed will depend on the allocated segment size and the size of the input tables. Each time a buffer is flushed, it is written to a disk location following the previous flush for that segment of buffers. The segments can contain a set of pointers to manage the file. The files associated with the output of the buffers located on the disk are called temporary file or output files.

Figure 6D:
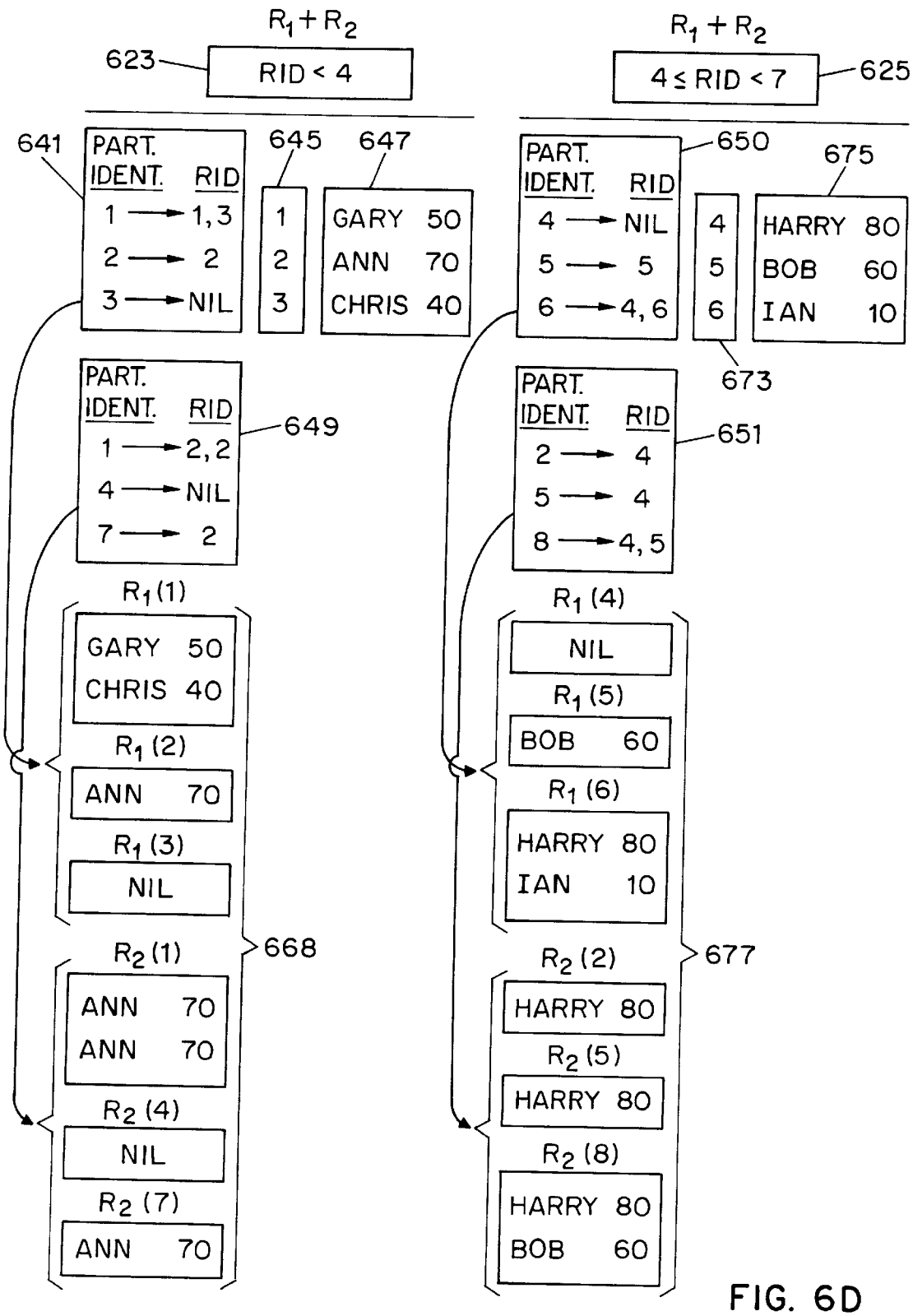
Figure 6E:
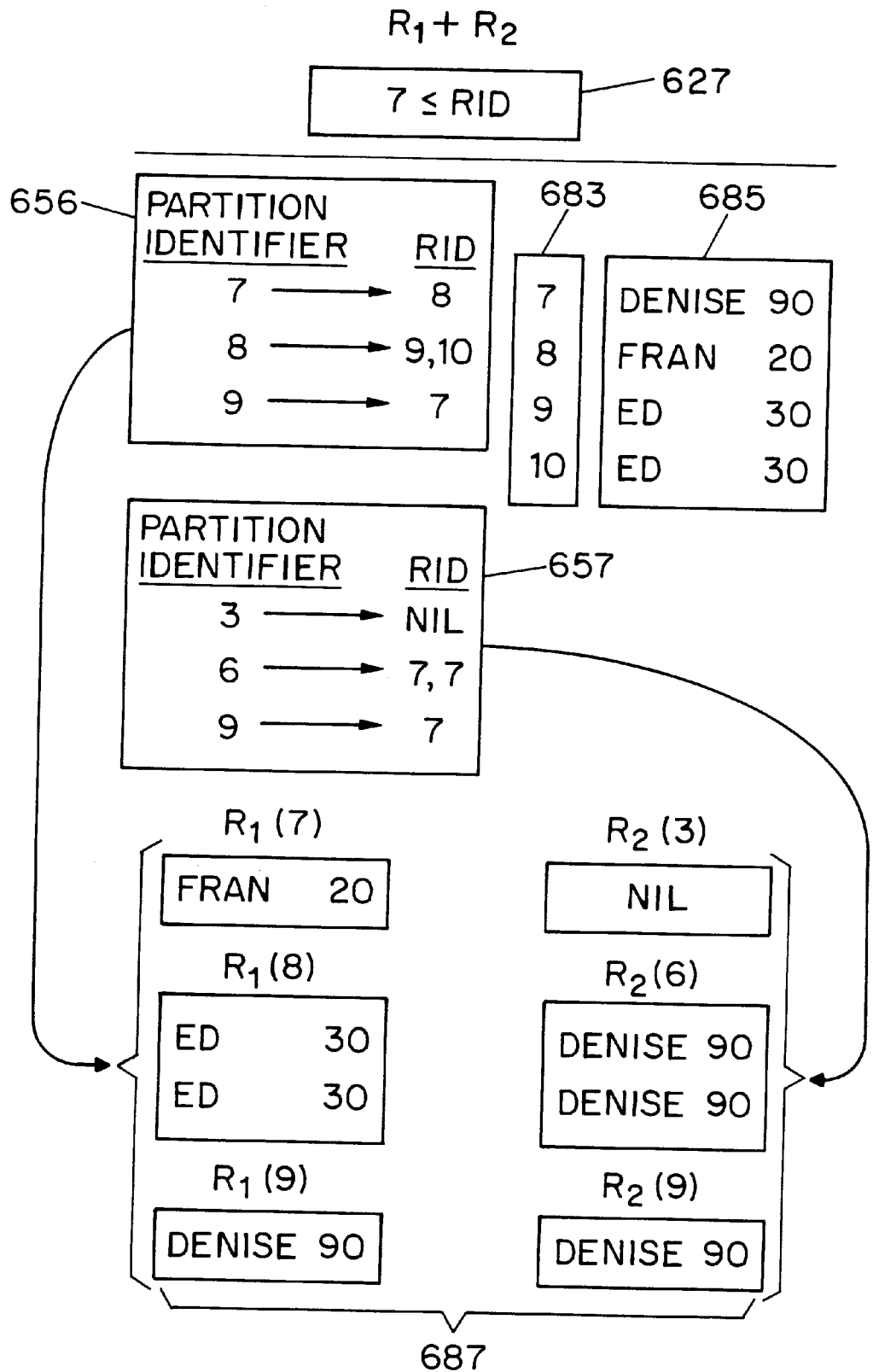

FIGS. 6D and 6E show the intermediate results of the next steps in the stripe-join technique applied to the tables in FIG. 6A for a self-join operation. The technique continues by reading the temporary files with matching conditions into memory together. Reading in temporary files with matching conditions only occurs in a self-join operation where the same table is being joined with itself. Thus, temporary file 641 will be read in with file 649; temporary file 650 will be read in with temporary file 651; and temporary file 656 will be read in together with temporary file 657. Each temporary file pair is then sorted by the RID number, reads in the appropriate record from the designated input table, organizes the records by the partition identifier and stores each record in an output partition. Temporary files 641 and 649 are read and sorted by the stored RIDs, duplicates of the RIDs from file the combined files are eliminated and the results of the sort appear in file 645 which is located in main memory. The original temporary files 641 and 649 are preserved. Box 647 shows the corresponding entry from the first table indicated by the RID in file 645. The records from first table 601 are then read sequentially in data blocks based upon the sorted RIDs. Because the first table 601 values have been previously partitioned in the temporary files which are associated with each buffer based on the defined conditions 623, 625 and 627, and the second table conditions match the first table conditions, the participating first table 601 records with RID values in the lowest third of all the first table's RIDs will be read at this time. The selected records of first table 601 are then read into available main memory. The records will be written to the corresponding output file in the order of the partition identifiers (files 641 and 649). Separate output files 668 are kept for the $R_1$ and $R_2$ tables to produce the join result. By writing in the partition identifier order to the proper output file, the records from the other input tables can be matched up to obtain the proper results of the self-join operation.

The remaining temporary files for $R_1$ and $R_2$ are then processed in the same manner. Temporary file 650 and 651 are read and sorted by the stored RIDs and the results of the sort are shown in file 673 located in RAM. Any duplication of RIDs are eliminated. The records of first table 601 are again read sequentially in the buffer starting at the lowest RID associated with the particular partition (in this example the lowest RID is "4"). The sorted file 673 corresponds to the read records in file 675. The records are then written to the corresponding output files 677 (either to the $R_1$ or $R_2$ output file groups) in the order of the partition identifiers associated with each RID. The same process is performed for temporary files 656 and 657 in FIG. 6E with the results of the sort stored in file 683 located in RAM. File 685 shows the records read in from the first input table. File 687 shows the output files from the processed temporary files.

The results of processing the first input table 601 are written in the order of the corresponding partition identifiers to the join result output file groups 668, 677 and 687. The files are then connected either through concatenation or file pointers in the order of the buffer identifiers for each input table (either $R_1$ or $R_2$). The output files are joined in the order of the partition identifiers for each table (or table duplicate) being joined. The output file 690 in FIG. 6E shows the results of the output files being concatenated or joined together. The output of the join result is vertically fragmented because the output for each input table is stored separately. The vertical fragmentation allows a reduced number of I/O transfers by processing the records of each input table separately and only reading and writing the records from first table 601 once. The order of the output result matches the original join index 615 while only reading each record from the single input table once during the technique. The output file could be sorted in a conventional manner if desired.

Figures 6F, 7:
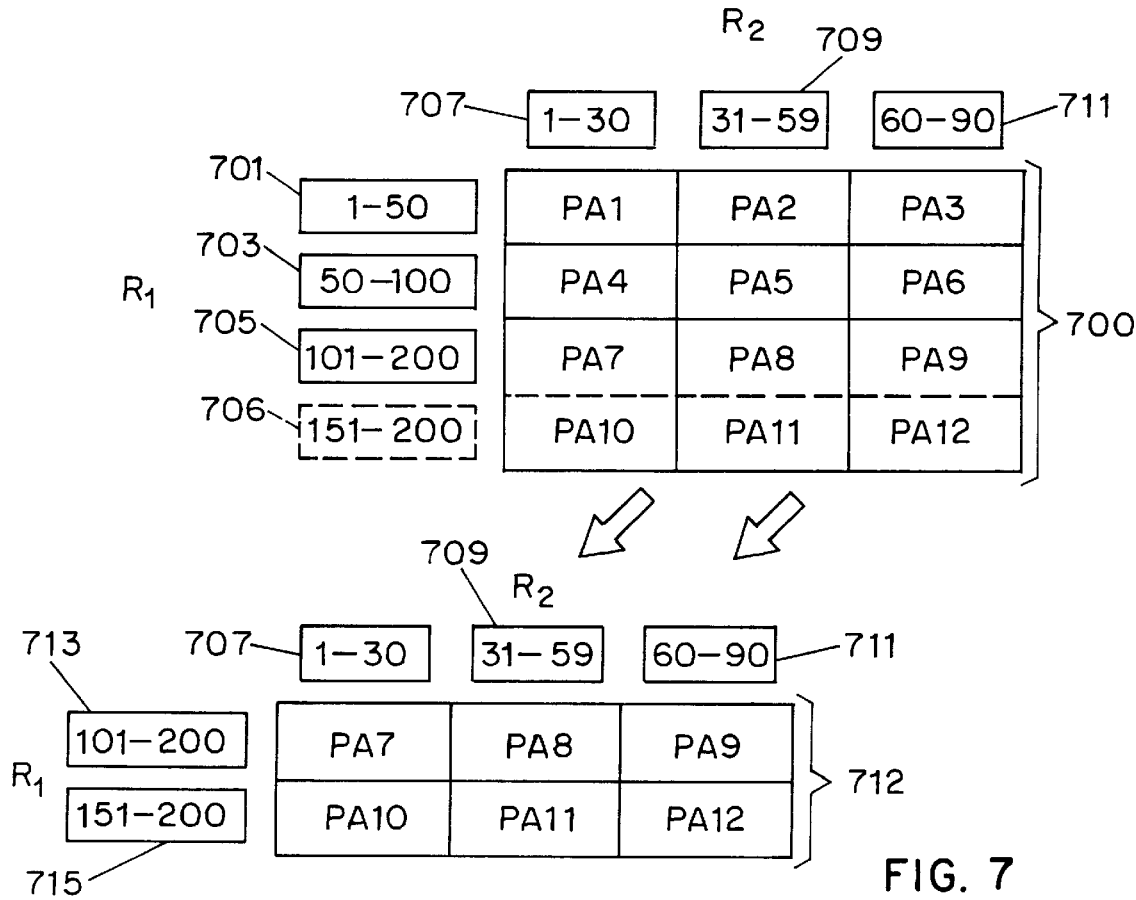
FIG. 7 is a graphical representation of a buffer structure using multi-level recursion in the stripe-join technique.

FIG. 6F shows a representation of the join result 690 for a self-join of first table 601 with columns 691, 692, 693, 694, 695 and 696. Column 691 shows the employee name, column 692 shows the employee salary, column 693 shows the manager name, column 694 shows the manager name, column 695 shows the manager salary, and column 696 shows the next manager's name. Thus, the output file 690 shows the desired result of the join operation. Additional columns appearing in the input table can be easily produced in the output file omitted from the join result. For example, the extra employee name and manager name columns in table 617 can be omitted from the join result.

If a join index is not yet created for a self-join or join of two or more tables, it can be generated using any convention technique. For example, a nested-loop technique can be used as described in U.S. patent application Ser. No. 08/632,958 entitled "System and Method for Performing Efficient Join Operation on Large Tables with a Small Main Memory" by Ross, which is hereby incorporated by reference.

FIG. 7 is a graphical representation of a multi-level recursion partitioning scheme which is required when the RID/partition identifier pair and matching records in a single buffer cannot all fit into main memory at the same time (called segment overflow). There are three main reasons for segment overflow. First, available main memory may not have sufficient size to meet the memory constraint for the number of required buffers, a calculation described hereafter. Secondly, the partitioning of the RIDs may not be sophisticated enough to handle extreme distributional skew. Finally, the available main memory may shrink if other processes are running concurrently which use main memory. When the number of records to be joined are very large and necessitate a large number of buffers, it may be necessary to re-partition some of the original partitions (and thus the buffers) so that all the re-partitioned buffers can fit in main memory at the time of RID sorting.

FIG. 7 shows an example of a buffer allocation that only allows six buffers (and nine partitions) to be present in main memory at one time. The six buffers correspond to six conditions in the allocation. However, the technique requires an extra buffer in order to process all the input tables. Therefore two buffers will have to be combined in the initial allocation. There are 12 partitions (PA1–PA12) required for the input tables $R_1$ and $R_2$. The last partitions PA10, PA11 and PA12 are now grouped with partitions PA7, PA8 and PA9. Partition grid 700 therefore has three conditions shown for $R_1$. Condition 701 is met if the $R_1$ RID is between 1 and 50; condition 703 is met of the $R_1$ RID is between 50 and 100; and condition 705 is met if the $R_1$ RID is between 101 and 200. The $R_1$ condition 706 of the $R_1$ RID being between 151 and 200 is tested for although the RIDs are placed with condition 705 before they are repartitioned. The $R_2$ condition 707 is met when the $R_2$ RID is between 1 and 30; the condition 709 is met when the $R_2$ RID is between 31 and 59; and the $R_2$ condition 711 is met when the $R_2$ RID is between 60 and 90. In this example, the condition 705 should be re-partitioned in half in order to gain a balanced number of records in each buffer, however the result would cause too many buffers to be created in main memory. Therefore, the buffer segment is repartitioned in a separate step when it is read from the temporary files.

Grid 712 shows the re-partitioning of the segment corresponding to condition 705 as being re-partitioned as both condition 713 (the $R_1$ RID is between 101 and 150) and condition 715 (the $R_1$ RID is between 151 and 200). Each sub-partition which will be processed as a separate partition which fits into main memory. The original allocation indicated in which partition number the record identifier belonged. The sub-partitioning allows for the input tables to be allocated to the required number of buffers, even if it initially exceeds the memory capacity of the processor system.

Since each buffer segment has a maximum number of records it can hold each time, the segment is required to be re-partitioned in this example. An RID of (32, 105) from the join index would be initially placed in partition PA8. However, after the join index had been assigned to a partition, the RIDs stored in partitions PA7, PA8 and PA9 would be re-partitioned in grid 712. This would create an equal distribution while still staying within the constraints of the memory size. The RID of (32, 106) would remain in partition PA8. The RID of (40, 160) would be placed in partition PA11. The last segment of partitions for a given table would be preferably chosen so that the overflow could be processed after the rest of the input table was processed. After the processing, the buffers would be joined in the following partition identifier order: PA1, PA2, PA3, PA4, PA5, PA6, PA7, PA8, PA9, PA10, PA11 and PA12.

The stripe-join technique will be operable in any database system which includes at least one way to logically connect groups of data together. The technique is not limited in applicability to relational databases which have been described in the examples provided herein.

Figure 8:
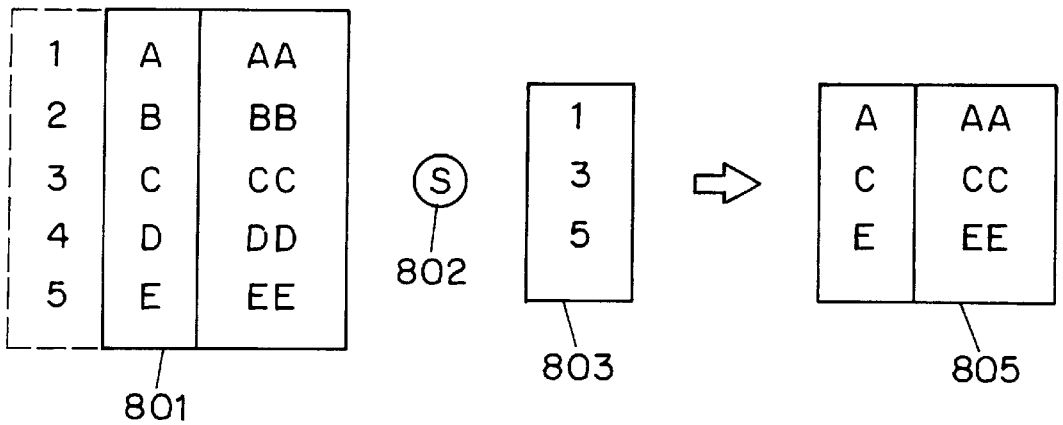
FIG. 8 is a graphical representation of a local selection which can be used in conjunction with the stripe-join technique.

FIG. 8 is a graphical representation of a local selection which can be incorporated into the stripe-join technique. A local selection chooses a subset of a table to be in a join result. Table 801 is an example of a table upon which a local selection can be performed. Local index 803 is a table with the RIDs of the records which satisfy the local selection condition. Symbol 802 indicates a local selection will be performed on table 801 using local index 803. Table 805 is the selection result of table 801 with index table 803. Only the first, third and fifth record are present in the result.

A local selection can be performed before the stripe-join technique to create a smaller input table to be processed. The join index would thus be built on the smaller input table. Alternatively, a local selection can be performed after the stripe-join result in order to locally select the desired records in the entire join result. If the join index already exists, the local selection could be performed on the join index itself, instead of on the input or output tables. The join index is often smaller than the input table and it would take less processing time to locally select the join index. The local selection of the join index would select particular RIDs to be part of the join result. If the join index had not yet been formed, the local selection could also be a part of the formation of the join index. This again would be preferable over processing the input tables themselves because of the smaller size of the index. One example of a local condition is all student names starting with the letter "P" in a student data group. Another example of a local condition is all offices on the fifth floor or above in a instructor's office data group.

Figure 9:
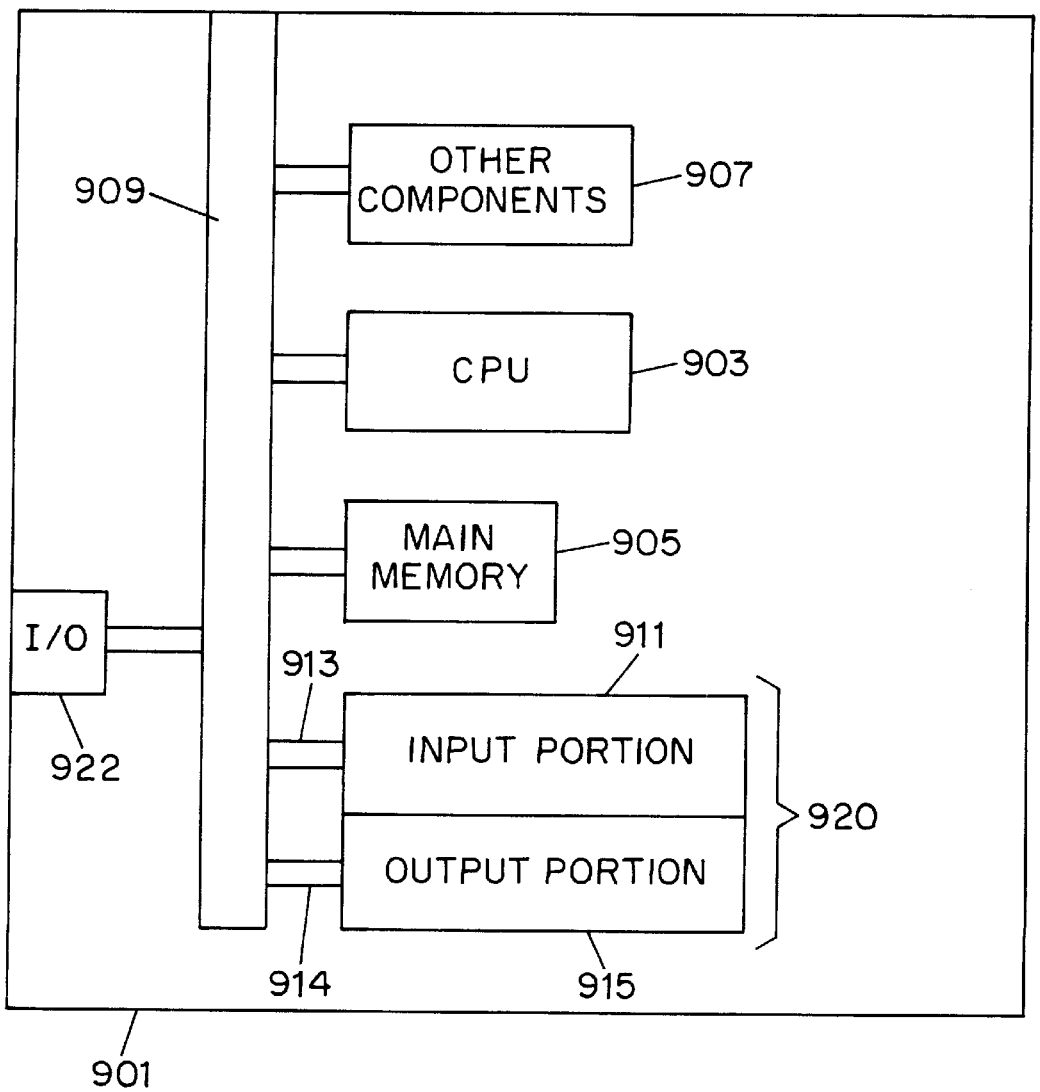
FIG. 9 is a schematic diagram of a computer system upon which the stripe-join method can be implemented.

FIG. 9 shows a hardware configuration upon which the stripe-join technique can be implemented. Computer 901 includes a central processing unit (CPU) 903, a main memory 905, a mass storage system 920, other components 907 necessary to operate computer 901, an I/O port 922, and a data bus 909 which is coupled to each component in the computer to allow data transfer. The data bus 909 may be any physical conduit of data and may actually comprise multiple data buses connected together. Main memory 905 could include a RAM or banks of RAM. The CPU 903 executes a stored program routine containing computer instructions to perform the stripe-join technique as described in conjunction with FIGS. 1 through 8. Mass storage system 920 includes an input memory portion 911 for storing input data and an output memory portion 915 for storing output data. The two portions 911 and 915 can be part of the same physical memory. Alternatively, the two portions could be physically separated and each could be located outside the computer 901 as external storage mediums. Mass storage system 920 can comprise multiple storage mediums connected together, such as multiple disks or magnetic tapes, when the amount of input data requires vast storage. Each input table could be stored on separate storage mediums. Mass storage system 920 could include any type of storage medium which is capable of storing a large amount of data. Some examples of storage mediums which may be used in storage system 920 include magnetic tapes, magnetic disks, optical disks, compact disks, or any other storage medium for large amounts of information. Input memory portion 911 contains at least one input tables to be joined. Connector 913 connects the computer 901 to input memory portion 911. I/O device 922 can be optionally used to distribute the processing operation for different input tables among multiple processors. I/O device 922 may be a conventional serial or parallel I/O port but is preferable a conventional network interface board. The I/O device 922 can be hooked up to a network for parallel processing. The temporary files or their locations in a shared main system could be communicated to the other processors. Alternatively, processor 903 may itself contain multiple CPUs to further enhance the efficiency of the operation by distributing the processing operation for each of the input tables between the processors.

Output memory portion 915 contains the results of the join operation. Connector 914 couples disk 915 to computer 901 and allows data to be transferred to and from computer 901 to disk 915. Connector 914 may be the same connector as connector 913 which transfers data to and from the input and output memory portions if those portions are interconnected. The output files containing the join results for each individual input tables are stored separately in output memory portion 915. The separate storage locations are due to the vertical fragmentation used by the stripe-join technique. Also located in output memory portion 915 are the temporary files which are used in the stripe-join technique and contain the join index RID/partition identifier pairs for each input table. Alternatively, the temporary files could be stored in main memory 905 depending upon their size relative to the size of main memory.

Multiple computers could be used to process discrete portions of the data such as the records for individual tables. These computers would be communicated with through I/O device 922. The stripe-join technique is easily adaptable to a distributed system because each of the input tables would be processed separately. If a computer 901 had multiple processes running concurrently, the available main memory would include only that portion of main memory which was allocated to the particular process performing the stripe-join technique.

In a configuration in which the input table(s) are much larger than main memory, the stripe-join technique will save many I/O operations over other techniques. Each input table is read in blocks from the input memory portion 911, processed by the CPU 903, and written to the output memory portion 915. Each input table is processed in this way and temporary files are created for each buffer in accordance with the stripe-join technique. Temporary files, if stored in the output memory portion 915, are read back from the output memory portion 915 to the CPU 903 in order to sort them and sequentially read the remaining input tables.

The stripe-join technique allows each input table to be read only once from the input memory portion 911 for the entire join operation (including a self-join) and allows the input tables to be processed simultaneously on different processors. The selected records from each input table are written only once to the output memory portion 915. This feature of saving I/O cycles is accomplished by the allocation of the buffers to enable sequential reading of the input tables and the vertical fragmentation which allows each input table to be processed individually.

In order to select the optimal number of buffers (which is directly related to portions) for a given join operation, the total size of the unique records from each input table that appear in the join index should be compared to the size of the available main memory. Both the number of buffer and number of partitions are related to the number of allocated conditions for each input table. The size of the join index indicates the exact size of the join result, one record for each join index entry. However, the same input table record may be indicated multiple times in a join index but only required to be read once. Therefore, the number of buffers and number of partitions is related to the number of unique input table records indicated in the join index. If the number of input table unique records for an input table is six times the size of the available main memory, then six buffers will be created for that buffer and an allocation condition will be derived to ensure that each buffer (and therefore partition segment) will have an associated temporary and output file of substantially equal size after the partitioning operation is performed. For example, if the selected records from the first table to be joined is four times as large as main memory, and the selected records from the second table is three times as large as main memory, then the sum of the two numbers will determine the number of buffers, in this case seven. The number of partitions would be the product of the two numbers, or twelve. However, since each input file is processed separately, the number of buffers are related to the number of identifiers. The buffers are created based on the size of available main memory.

The partitioning values, or conditions as defined above, for each buffer can be defined exactly in order to substantially equally distribute the final join result records between the buffers by reading the join index and determining the conditions based on the RID values in the join index. The relative size of the records can be taken into account. Since the join index lists all the RIDs of the records to be present in the join result, the list of unique RIDs can be apportioned exactly (or at least very close) for all the buffers (or segments). A pre-processing step may be performed to read in the join index and calculate the partitioning conditions in this manner. Alternatively, if the join index must be computed, the partitioning values can be developed at the same time the join index is created. By using the join index as the source for the partitioning values, any skew created by processing the tables can be prevented. If the buffers were simply partitioned on the tables' entries evenly without consulting the join index RID values, skew would occur because not every record will be read, but only the selected records that appear in the join index. Some index RID may also appear numerous times on the join index when there are multiple matches.

An alternative way to determine the conditions is to sample a portion of the join index. Given that the input tables are very large for optimal use, the sample would only need to be a small portion of the entire table to statistically calculate an allocation that is close to the optimal. Sampling the join index would save both I/O and processing operations.

The stripe-join technique does have some memory size requirements in order to achieve optimal performance during operation. Optimal operation of stripe-join does require a particular size of main memory for a given size of input tables to be processed. The requirement is due to the fact that a buffer or partition segment (made of multiple partitions) must fit into main memory all at once for processing. The required main memory can be derived with the following equations: The first two steps of the technique, that of memory allocation and partition identifying yields the equation:

$$v*(k_1 + \ldots + k_r) \leq m$$

where r=number of tables to be joined; v=length of temporary file sequence in a disk buffer; $k_i$=number of conditions for the $i^{th}$ table; and m=size of main memory (in blocks). An additional size constraint occurs in the third step in the technique (of sorting and reading in the remaining tables) which requires the step to occur in main memory. This constraint yields the equation:

$$|J|/r + T_i*|R_i| \leq K_i*m$$

where $T_i$=the proportion of the records in table i that participate in the join (proportion of selected records); |J| is the number of blocks in the join index; r is the number of tables to be joined; $|R_i|$=the number of blocks in table i; $K_i$ number of segments for $i^{th}$ table; m=size of main memory.

Combining the above two memory constraints, and assuming that $v \geq 1$, the equations can be reduced to $$m \geq \sqrt{|J| + T_1|R_1| + \ldots + T_r|R_r|}$$

The above constraint for multiple input tables of the same size which are joined when main memory is 128 MB and disk block size is 8 KB yields a maximum size of two terabytes for the input tables. This example shows that the input tables can be very large compared to the size of the main memory. 128 MB is a typical size of RAM in a work-station. Larger input tables can be processed if the size of main memory increases. Smaller amounts of RAM can used to process smaller input tables. Since only selected records are read from each input table, the total size of the input table can be even greater since only the selected records will be read and processed.

The foregoing merely illustrates the principles of the invention. It will thus be appreciated that those skilled in the art will be able to devise numerous systems, apparatus and methods which, although not explicitly shown or described herein, embody the principles of the invention and are thus within the spirit and scope of the invention as defined by its claims.

We claim:

1. A method for joining in a database system one or more input tables comprised of records stored in a storage medium using a join index indicative of records to be joined and having an index entry for each record to be included an output resulting from said join, said method comprising the steps of:

（a) allocating an array of partitions in a memory responsive to said index entries of each said input table in said join index;

(b) reading said join index;

(c) storing said join index entries corresponding to each of said input tables and a corresponding partition identifier to temporary files associated with said allocated partitions;

(d) reading in turn said index entries and said corresponding partition identifier in each of said temporary files and sorting each said temporary file;

(e) sequentially reading portions of said tables only if said portion includes a record identified in said sorted temporary file; and (f) writing said read records in accordance with an order of said corresponding partition identifiers to separate output files associated with each said input table.

2. The method of claim 1, wherein said allocation step substantially equally distributes said records of said input tables among said array of partitions.

3. The method of claim 2, wherein said allocations steps includes reading said join index to determine the allocation.

4. The method of claim 1, wherein an optimal number of partitions is determined for said array of partitions.

5. The method of claim 1, wherein each of said input tables are read only once.

6. The method of claim 1, further comprising the step of generating the join index.

7. The method of claim 1, wherein at least one of said input tables is larger than said memory.

8. The method of claim 1, wherein said records are read as part of data blocks.

9. The method of claim 1, further including the step of locally selecting at least one of the input files.

10. The method of claim 1, further including the step of locally selecting said join index.

11. The method of claim 1, wherein said join index further includes additional records which are included in said output files of at least one of said input tables.

12. The method of claim 1, wherein said step of sorting each said temporary file includes sorting a plurality of temporary files together.

13. The method of claim 1, wherein said join operation includes a self-join for at least one said input table.

14. The method of claim 13, wherein said allocating step allocates said partitions using duplicate conditions for said self-join.

15. The method of claim 14, wherein said reading said index entry step further comprises reading said index entry for said duplicate condition prior to said sorting step.

16. The method of claim 1, wherein said allocation step uses a multi-recursion allocation.

17. The method of claim 16, wherein said multi-recursion allocation re-partitions a portion of said array of partitions.

18. A method for joining one or more input tables comprised of records stored in a storage medium in a database system which includes said storage medium and at least one memory having a storage capacity smaller than necessary to store at least one of said input tables, said method using a join index indicative of records to be joined and having an index entry for each record to be included in an output resulting from said join, and comprising the steps of:

(a) allocating an array of partitions with partition identifiers based on each of said index entries in said join index in said at least one memory;

(b) separately processing said plurality of input tables by reading each said input tables into one of said at least one memory and matching each said record in said input tables to one of said partitions during said joining; and (c) writing join results for each one of said input tables into separate output files responsive to said partition identifiers.

19. The method of claim 18, wherein said input tables are read into one of said memories only once during said joining.

20. The method of claim 18, wherein said join results are written to said output files only once during said joining.

21. The method of claim 18, wherein said allocation step substantially equally distributes said records of said input tables among said array of buffers.

22. The method of claim 18, wherein said allocations step includes reading said join index to determine said allocation.

23. The method of claim 18 further comprising the step of generating the join index.

24. The method of claim 18, wherein said separate output files are connected by file pointers.

25. The method of claim 18, wherein said join index further includes additional records which are included in said output file of one of said input tables.

26. The method of claim 18, wherein said join operation includes a self-join operation for at least one input table.

27. The method of claim 26, wherein said allocating step allocates said partitions using duplicate conditions for said self-join.

28. The method of claim 27, further comprising performing said allocation step prior to said processing step.

29. The method of claim 18, wherein said allocation step uses a multi-recursion allocation.

30. The method of claim 29, wherein said multi-recursion allocation re-partitions a portion of said array of partitions.

31. An apparatus for joining a plurality of input tables comprised of records in a database system using a join index indicative of records to be joined and having an index entry for each record to be included in an output resulting from said join, said apparatus comprising:

(a) means for allocating an array of partitions including assigning partition identifiers in a memory responsive to each said index entry in said join index;

(b) means for reading said join index and for sequentially reading said input tables during said join;

(c) means for processing said input tables using said allocated array of partitions and corresponding partition identifiers; and (d) means for writing said records to separate output files responsive to said corresponding partition identifier for each said input table.

32. The apparatus of claim 31, wherein said reading means reads each said input table only once during said join.

33. The apparatus of claim 31, wherein said allocation means allocates said partitions using duplicate conditions for a performing a self-join.

34. The apparatus of claim 31, further comprising an input/output device for enabling parallel processing of said join with at least one other said apparatus.

35. A database system capable of performing join operations on one or more input tables using a join index, comprising:

(a) at least one central processing unit;

(b) a main memory partitionable into a plurality of partitions identified by a partition identifier;

(c) a storage medium separate from such main memory;

(d) at least one input tables stored in said storage medium;

(e) a join index stored in said storage medium indicating corresponding entries of said at least one table to be joined, wherein said main memory partitions are responsive to each of said corresponding entries in said join index;

(f) a plurality of output files, wherein each one of said output files corresponds to only one of said at least one input table;

(g) wherein at least one of said processing unit processes said join operation by reading each of said at least one input table from said storage medium, processing said at least one input table in said main memory using said partitions and partition identifiers, and writing said join operation's results for each said input table to said corresponding output files.

36. The system in claim 35, wherein said main memory's storage capacity is smaller than at least one of said input tables stored in said storage medium.

37. The system in claim 35, wherein said join index is generated by said central processing unit prior to said join operation.

38. The system of claim 35, wherein said at least one processing unit reads each said input table only once during said join operation.

39. The system of claim 35, wherein said partitions are allocated using duplicate conditions for performing a self-join.

* * * * *